United States Patent
Priyadarshan et al.

(10) Patent No.: US 8,983,978 B2
(45) Date of Patent: Mar. 17, 2015

(54) LOCATION-INTENTION CONTEXT FOR CONTENT DELIVERY

(75) Inventors: Eswar Priyadarshan, West Roxbury, MA (US); Dan Marius Grigorovici, Pleasanton, CA (US); Omar Abdala, Cambridge, MA (US)

(73) Assignee: Apple Inc., Cupertino, CA (US)

( * ) Notice: Subject to any disclaimer, the term of this patent is extended or adjusted under 35 U.S.C. 154(b) by 108 days.

(21) Appl. No.: 12/873,266

(22) Filed: Aug. 31, 2010

(65) Prior Publication Data

US 2012/0054180 A1 Mar. 1, 2012

(51) Int. Cl.
*G06F 17/30* (2006.01)

(52) U.S. Cl.
CPC ............... *G06F 17/30528* (2013.01)
USPC ........................ 707/751; 705/14.66

(58) Field of Classification Search
CPC ............ G06F 17/30386; G06F 17/30867; G06F 17/30702; G06F 17/30035; G06F 17/30528
USPC ........................ 707/751; 705/14.66
See application file for complete search history.

(56) References Cited

U.S. PATENT DOCUMENTS

| | | | |
|---|---|---|---|
| 5,128,981 A | 7/1992 | Tsukamoto et al. | |
| 5,408,519 A | 4/1995 | Pierce et al. | |
| 5,613,213 A | 3/1997 | Naddell et al. | |
| 5,678,179 A | 10/1997 | Turcotte et al. | |
| 5,978,775 A | 11/1999 | Chen | |
| 5,978,833 A | 11/1999 | Pashley et al. | |
| 6,006,197 A | 12/1999 | d'Eon et al. | |
| 6,009,410 A | 12/1999 | LeMole et al. | |
| 6,023,700 A | 2/2000 | Owens et al. | |
| 6,055,512 A | 4/2000 | Dean et al. | |
| 6,055,513 A | 4/2000 | Katz et al. | |
| 6,057,872 A | 5/2000 | Candelore | |
| 6,097,942 A | 8/2000 | Laiho | |
| 6,286,005 B1 | 9/2001 | Cannon | |
| 6,334,145 B1 | 12/2001 | Adams et al. | |

(Continued)

FOREIGN PATENT DOCUMENTS

| | | |
|---|---|---|
| BE | 1015704 | 7/2005 |
| DE | 19941461 | 3/2001 |

(Continued)

OTHER PUBLICATIONS

"Advertisement System, Method and Computer Program Product", IP.com Prior Art Database Disclosure, Pub No. IPCOM000138557D, dated Jul. 24, 2006, IP.com, Amherst, NY (Available online at http://priorartdatabase.com/IPCOM/000138557, last visited Aug. 30, 2010)., Jul. 24, 2006.

(Continued)

*Primary Examiner* — Joshua Bullock
(74) *Attorney, Agent, or Firm* — Novak Druce Connolly Bove + Quigg LLP

(57) ABSTRACT

Invitational content targeted to a particular behavior can be served to the user when the user is likely to reproduce a desired behavior. The user is classified into one or more spatial-temporal segments based on an analysis of the user's characteristics and the user's past behavior. When a request is made for an item of invitational content, a spatial-temporal segment is selected based on a substantial likelihood that the current context will lead to a repeat of the representative past behavior. An item of invitational content associated with the selected segment is then served to the user.

21 Claims, 22 Drawing Sheets

(56) References Cited

U.S. PATENT DOCUMENTS

| | | |
|---|---|---|
| 6,338,044 B1 | 1/2002 | Cook et al. |
| 6,345,279 B1 | 2/2002 | Li et al. |
| 6,381,465 B1 | 4/2002 | Chern et al. |
| 6,393,407 B1 | 5/2002 | Middleton, III et al. |
| 6,405,243 B1 | 6/2002 | Nielsen |
| 6,408,309 B1 | 6/2002 | Agarwal |
| 6,446,261 B1 | 9/2002 | Rosser |
| 6,480,587 B1 | 11/2002 | Rao et al. |
| 6,556,817 B1 | 4/2003 | Souissi et al. |
| 6,647,269 B2 | 11/2003 | Hendrey et al. |
| 6,684,249 B1 | 1/2004 | Frerichs et al. |
| 6,690,394 B1 | 2/2004 | Harui |
| 6,698,020 B1 | 2/2004 | Zigmond et al. |
| 6,718,178 B1 | 4/2004 | Sladek et al. |
| 6,718,551 B1 | 4/2004 | Swix et al. |
| 6,795,808 B1 | 9/2004 | Strubbe et al. |
| 6,795,863 B1 | 9/2004 | Doty, Jr. |
| 6,886,000 B1 | 4/2005 | Aggarwal et al. |
| 6,889,054 B2 | 5/2005 | Himmel et al. |
| 6,920,326 B2 | 7/2005 | Agarwal et al. |
| 6,973,299 B2 | 12/2005 | Apfel |
| 6,990,462 B1 | 1/2006 | Wilcox et al. |
| 7,039,599 B2 | 5/2006 | Merriman et al. |
| 7,072,947 B1 | 7/2006 | Knox et al. |
| 7,136,871 B2 | 11/2006 | Ozer et al. |
| 7,149,537 B1 | 12/2006 | Kupsh et al. |
| 7,203,684 B2 | 4/2007 | Carobus et al. |
| 7,251,478 B2 | 7/2007 | Cortegiano |
| 7,280,818 B2 | 10/2007 | Clayton |
| 7,346,630 B2 | 3/2008 | Eichstadt et al. |
| 7,370,002 B2 | 5/2008 | Heckerman et al. |
| 7,558,559 B2 | 7/2009 | Alston |
| 7,685,019 B2 | 3/2010 | Collins |
| 7,730,017 B2 | 6/2010 | Nance et al. |
| 7,734,632 B2 | 6/2010 | Wang |
| 7,870,576 B2 | 1/2011 | Eldering |
| 7,882,518 B2 | 2/2011 | Finseth et al. |
| 7,903,099 B2 | 3/2011 | Baluja |
| 7,921,069 B2 | 4/2011 | Canny et al. |
| 7,925,283 B2 | 4/2011 | Smith et al. |
| 7,984,014 B2 | 7/2011 | Song et al. |
| 8,046,810 B2 | 10/2011 | Srivastava |
| 8,132,110 B1 | 3/2012 | Appelman et al. |
| 8,191,098 B2 | 5/2012 | Cooper et al. |
| 8,196,166 B2 | 6/2012 | Roberts |
| 8,229,458 B2 | 7/2012 | Busch |
| 8,380,562 B2 | 2/2013 | Toebes et al. |
| 8,611,873 B2 | 12/2013 | Onyon et al. |
| 2001/0008404 A1 | 7/2001 | Naito et al. |
| 2001/0044739 A1 | 11/2001 | Bensamana |
| 2001/0047272 A1 | 11/2001 | Frietas et al. |
| 2001/0051925 A1 | 12/2001 | Kang |
| 2002/0006803 A1 | 1/2002 | Mendiola et al. |
| 2002/0016736 A1 | 2/2002 | Cannon et al. |
| 2002/0019829 A1 | 2/2002 | Shapiro |
| 2002/0021307 A1 | 2/2002 | Glenn et al. |
| 2002/0021809 A1 | 2/2002 | Salo et al. |
| 2002/0032771 A1 | 3/2002 | Gledje |
| 2002/0052781 A1 | 5/2002 | Aufricht et al. |
| 2002/0075305 A1 | 6/2002 | Beaton et al. |
| 2002/0077130 A1 | 6/2002 | Owensby |
| 2002/0078147 A1 | 6/2002 | Bouthors et al. |
| 2002/0083411 A1 | 6/2002 | Bouthers et al. |
| 2002/0099842 A1 | 7/2002 | Jennings et al. |
| 2002/0128908 A1 | 9/2002 | Levin et al. |
| 2002/0137507 A1 | 9/2002 | Winkler |
| 2002/0138291 A1 | 9/2002 | Vaidyanathan et al. |
| 2002/0161770 A1 | 10/2002 | Shapiro et al. |
| 2002/0164977 A1 | 11/2002 | Link, II et al. |
| 2002/0165773 A1 | 11/2002 | Natsumo et al. |
| 2002/0175935 A1 | 11/2002 | Wang et al. |
| 2003/0003929 A1 | 1/2003 | Himmel et al. |
| 2003/0003935 A1 | 1/2003 | Vesikivi et al. |
| 2003/0023489 A1 | 1/2003 | McGuire et al. |
| 2003/0040297 A1 | 2/2003 | Pecen et al. |
| 2003/0083931 A1 | 5/2003 | Lang |
| 2003/0101454 A1 | 5/2003 | Ozer et al. |
| 2003/0126015 A1 | 7/2003 | Chan et al. |
| 2003/0154300 A1 | 8/2003 | Mostafa |
| 2003/0182567 A1 | 9/2003 | Barton et al. |
| 2003/0188017 A1 | 10/2003 | Nomura |
| 2003/0191689 A1 | 10/2003 | Bosarge et al. |
| 2003/0197719 A1 | 10/2003 | Lincke et al. |
| 2004/0003398 A1 | 1/2004 | Donian et al. |
| 2004/0034795 A1 | 2/2004 | Anderson et al. |
| 2004/0043777 A1 | 3/2004 | Brouwer et al. |
| 2004/0045029 A1 | 3/2004 | Matsuura |
| 2004/0054576 A1 | 3/2004 | Kanerva et al. |
| 2004/0068435 A1 | 4/2004 | Braunzell |
| 2004/0133480 A1 | 7/2004 | Domes |
| 2004/0136358 A1 | 7/2004 | Hind et al. |
| 2004/0158612 A1 | 8/2004 | Concannon |
| 2004/0158858 A1 | 8/2004 | Paxton et al. |
| 2004/0162883 A1 | 8/2004 | Oreizy et al. |
| 2004/0185883 A1 | 9/2004 | Rukman |
| 2004/0192359 A1 | 9/2004 | McRaild et al. |
| 2004/0201668 A1 | 10/2004 | Matsubara et al. |
| 2004/0203761 A1 | 10/2004 | Baba et al. |
| 2004/0203851 A1 | 10/2004 | Vetro et al. |
| 2004/0204133 A1 | 10/2004 | Andrew et al. |
| 2004/0209649 A1 | 10/2004 | Lord |
| 2004/0259526 A1 | 12/2004 | Goris et al. |
| 2005/0010641 A1 | 1/2005 | Staack |
| 2005/0021397 A1 | 1/2005 | Cui et al. |
| 2005/0021853 A1 | 1/2005 | Parekh et al. |
| 2005/0055408 A1 | 3/2005 | Dong |
| 2005/0060425 A1 | 3/2005 | Yeh et al. |
| 2005/0071224 A1 | 3/2005 | Fikes et al. |
| 2005/0125397 A1 | 6/2005 | Gross et al. |
| 2005/0138140 A1 | 6/2005 | Wen et al. |
| 2005/0148350 A1 | 7/2005 | Kamphuis |
| 2005/0186940 A1 | 8/2005 | Schatzberger et al. |
| 2005/0228680 A1 | 10/2005 | Malik |
| 2005/0228797 A1 | 10/2005 | Koningstein et al. |
| 2005/0239495 A1 | 10/2005 | Bayne |
| 2005/0239504 A1 | 10/2005 | Ishii et al. |
| 2005/0249216 A1 | 11/2005 | Jones |
| 2005/0273465 A1 | 12/2005 | Kimura |
| 2005/0273833 A1 | 12/2005 | Soinio |
| 2005/0289113 A1 | 12/2005 | Bookstaff |
| 2006/0031327 A1 | 2/2006 | Kredo |
| 2006/0040642 A1 | 2/2006 | Boris et al. |
| 2006/0040749 A1 | 2/2006 | Suzuki et al. |
| 2006/0041470 A1 | 2/2006 | Filho et al. |
| 2006/0048059 A1 | 3/2006 | Etkin |
| 2006/0059133 A1 | 3/2006 | Moritani |
| 2006/0068845 A1 | 3/2006 | Muller et al. |
| 2006/0075425 A1 | 4/2006 | Koch et al. |
| 2006/0095511 A1 | 5/2006 | Munarriz et al. |
| 2006/0109969 A1 | 5/2006 | Oh |
| 2006/0117378 A1 | 6/2006 | Tam et al. |
| 2006/0123014 A1 | 6/2006 | Ng |
| 2006/0129455 A1 | 6/2006 | Shah |
| 2006/0141923 A1 | 6/2006 | Goss |
| 2006/0161520 A1 | 7/2006 | Brewer et al. |
| 2006/0167621 A1 | 7/2006 | Dale |
| 2006/0167747 A1 | 7/2006 | Goodman et al. |
| 2006/0168616 A1 | 7/2006 | Candelore |
| 2006/0194595 A1 | 8/2006 | Myllynen et al. |
| 2006/0200460 A1 | 9/2006 | Meyerzon et al. |
| 2006/0200461 A1 | 9/2006 | Lucas et al. |
| 2006/0206586 A1 | 9/2006 | Ling et al. |
| 2006/0253327 A1 | 11/2006 | Morris et al. |
| 2006/0276170 A1 | 12/2006 | Radhakrishnan et al. |
| 2006/0276213 A1 | 12/2006 | Gottschalk et al. |
| 2006/0282319 A1 | 12/2006 | Maggio |
| 2006/0282328 A1 | 12/2006 | Gerace et al. |
| 2006/0286963 A1 | 12/2006 | Koskinen et al. |
| 2006/0286964 A1 | 12/2006 | Polanski et al. |
| 2006/0288124 A1 | 12/2006 | Kraft et al. |
| 2006/0294066 A1 | 12/2006 | Dettinger et al. |
| 2007/0004333 A1 | 1/2007 | Kavanti |
| 2007/0004380 A1 | 1/2007 | Ylikoski |
| 2007/0011344 A1 | 1/2007 | Paka et al. |

(56) References Cited

U.S. PATENT DOCUMENTS

| | | |
|---|---|---|
| 2007/0024441 A1 | 2/2007 | Kahn et al. |
| 2007/0027760 A1 | 2/2007 | Collins et al. |
| 2007/0033104 A1 | 2/2007 | Collins et al. |
| 2007/0037562 A1 | 2/2007 | Smith-Kerker et al. |
| 2007/0047523 A1 | 3/2007 | Jiang |
| 2007/0061195 A1 | 3/2007 | Liu et al. |
| 2007/0061300 A1 | 3/2007 | Ramer et al. |
| 2007/0067215 A1 | 3/2007 | Agarwal et al. |
| 2007/0072631 A1 | 3/2007 | Mock et al. |
| 2007/0074262 A1 | 3/2007 | Kikkoji et al. |
| 2007/0078712 A1 | 4/2007 | Ott, IV et al. |
| 2007/0083602 A1 | 4/2007 | Heggenhougen et al. |
| 2007/0088687 A1 | 4/2007 | Bromm et al. |
| 2007/0088801 A1 | 4/2007 | Levkovitz et al. |
| 2007/0088851 A1 | 4/2007 | Levkovitz et al. |
| 2007/0093202 A1 | 4/2007 | Hwang et al. |
| 2007/0094066 A1 | 4/2007 | Kumar et al. |
| 2007/0100651 A1 | 5/2007 | Ramer et al. |
| 2007/0100805 A1 | 5/2007 | Ramer et al. |
| 2007/0105536 A1 | 5/2007 | Tingo, Jr. |
| 2007/0113243 A1 | 5/2007 | Brey |
| 2007/0117571 A1 | 5/2007 | Musial |
| 2007/0118592 A1 | 5/2007 | Bachenberg |
| 2007/0136457 A1 | 6/2007 | Dai et al. |
| 2007/0149208 A1 | 6/2007 | Syrbe et al. |
| 2007/0150171 A1 | 6/2007 | Tengler et al. |
| 2007/0156534 A1 | 7/2007 | Lerner et al. |
| 2007/0165599 A1 | 7/2007 | Skog et al. |
| 2007/0180147 A1 | 8/2007 | Leigh |
| 2007/0192038 A1 | 8/2007 | Kameyama |
| 2007/0192409 A1 | 8/2007 | Kleinstern et al. |
| 2007/0198485 A1 | 8/2007 | Ramer et al. |
| 2007/0208619 A1 | 9/2007 | Branam et al. |
| 2007/0214470 A1 | 9/2007 | Glasgow et al. |
| 2007/0244750 A1 | 10/2007 | Grannan et al. |
| 2007/0260624 A1 | 11/2007 | Chung et al. |
| 2007/0288950 A1 | 12/2007 | Downey et al. |
| 2007/0290787 A1 | 12/2007 | Fiatal et al. |
| 2007/0300185 A1 | 12/2007 | Macbeth et al. |
| 2007/0300263 A1 | 12/2007 | Barton et al. |
| 2008/0004046 A1 | 1/2008 | Mumick et al. |
| 2008/0004958 A1 | 1/2008 | Ralph et al. |
| 2008/0013537 A1 | 1/2008 | Dewey et al. |
| 2008/0032703 A1 | 2/2008 | Krumm et al. |
| 2008/0032717 A1 | 2/2008 | Sawada et al. |
| 2008/0034404 A1 | 2/2008 | Pereira et al. |
| 2008/0040175 A1 | 2/2008 | Dellovo |
| 2008/0057947 A1 | 3/2008 | Marolia et al. |
| 2008/0065491 A1 | 3/2008 | Bakman |
| 2008/0070579 A1 | 3/2008 | Kankar et al. |
| 2008/0071875 A1 | 3/2008 | Koff et al. |
| 2008/0071929 A1 | 3/2008 | Motte et al. |
| 2008/0082620 A1 | 4/2008 | Barsness |
| 2008/0082686 A1 | 4/2008 | Schmidt et al. |
| 2008/0091796 A1 | 4/2008 | Story et al. |
| 2008/0140508 A1 | 6/2008 | Anand et al. |
| 2008/0215744 A1 | 9/2008 | Shenfield |
| 2008/0228568 A1 | 9/2008 | Williams et al. |
| 2008/0243619 A1 | 10/2008 | Sharman et al. |
| 2008/0249832 A1 | 10/2008 | Richardson et al. |
| 2008/0262927 A1 | 10/2008 | Kanayama et al. |
| 2008/0271068 A1 | 10/2008 | Ou et al. |
| 2008/0281606 A1 | 11/2008 | Kitts et al. |
| 2008/0288476 A1 | 11/2008 | Kim et al. |
| 2008/0288649 A1 | 11/2008 | Burckart et al. |
| 2008/0317010 A1 | 12/2008 | Naqvi et al. |
| 2008/0319836 A1 | 12/2008 | Aaltonen et al. |
| 2009/0006194 A1* | 1/2009 | Sridharan et al. ............... 705/14 |
| 2009/0029721 A1 | 1/2009 | Doraswamy |
| 2009/0049090 A1 | 2/2009 | Shenfield et al. |
| 2009/0055739 A1 | 2/2009 | Murillo et al. |
| 2009/0063249 A1 | 3/2009 | Tomlin et al. |
| 2009/0106111 A1 | 4/2009 | Walk et al. |
| 2009/0125377 A1 | 5/2009 | Somji et al. |
| 2009/0132395 A1 | 5/2009 | Lam et al. |
| 2009/0132942 A1 | 5/2009 | Santoro et al. |
| 2009/0157560 A1 | 6/2009 | Carter et al. |
| 2009/0197619 A1 | 8/2009 | Colligan et al. |
| 2009/0204977 A1 | 8/2009 | Tavares et al. |
| 2009/0216847 A1 | 8/2009 | Krishnaswamy et al. |
| 2009/0275315 A1 | 11/2009 | Alston |
| 2009/0286520 A1 | 11/2009 | Nielsen et al. |
| 2009/0298483 A1* | 12/2009 | Bratu et al. ............... 455/414.2 |
| 2010/0082397 A1* | 4/2010 | Blegen ............... 705/10 |
| 2010/0082423 A1 | 4/2010 | Nag et al. |
| 2010/0088152 A1 | 4/2010 | Bennett |
| 2010/0114654 A1 | 5/2010 | Lukose et al. |
| 2010/0125505 A1 | 5/2010 | Puttaswamy |
| 2010/0131964 A1 | 5/2010 | Firminger et al. |
| 2010/0138271 A1 | 6/2010 | Henkin |
| 2010/0146146 A1 | 6/2010 | Welts et al. |
| 2010/0151838 A1 | 6/2010 | Wormald et al. |
| 2010/0153216 A1 | 6/2010 | Liang et al. |
| 2010/0161424 A1 | 6/2010 | Sylvain |
| 2010/0169157 A1 | 7/2010 | Muhonen et al. |
| 2010/0169176 A1 | 7/2010 | Turakhia |
| 2010/0205615 A1 | 8/2010 | Kim et al. |
| 2010/0257540 A1 | 10/2010 | Schuler et al. |
| 2010/0274869 A1 | 10/2010 | Warila et al. |
| 2010/0317332 A1 | 12/2010 | Bathiche et al. |
| 2011/0175754 A1 | 7/2011 | Karpinsky |
| 2011/0225048 A1 | 9/2011 | Nair |
| 2011/0244846 A1 | 10/2011 | Min |
| 2011/0256904 A1 | 10/2011 | Simmons |
| 2011/0320981 A1 | 12/2011 | Shen et al. |
| 2012/0023212 A1 | 1/2012 | Roth et al. |
| 2012/0188080 A1 | 7/2012 | Haupt et al. |
| 2012/0197484 A1 | 8/2012 | Nath et al. |
| 2012/0260184 A1 | 10/2012 | Dawes et al. |
| 2012/0265433 A1 | 10/2012 | Viola et al. |
| 2012/0324434 A1 | 12/2012 | Tewari et al. |
| 2013/0005309 A1 | 1/2013 | Clark |
| 2013/0009460 A1 | 1/2013 | Speach |
| 2013/0029650 A1 | 1/2013 | Xiao et al. |
| 2013/0151599 A1 | 6/2013 | Santoro et al. |
| 2013/0176328 A1 | 7/2013 | Pillai |
| 2013/0226449 A1 | 8/2013 | Rovik |
| 2013/0281079 A1 | 10/2013 | Vidal et al. |

FOREIGN PATENT DOCUMENTS

| | | |
|---|---|---|
| DE | 10061984 | 6/2002 |
| EP | 0985309 | 3/2000 |
| EP | 1061465 | 12/2000 |
| EP | 1073293 | 1/2001 |
| EP | 1107137 | 6/2001 |
| EP | 1109371 | 6/2001 |
| EP | 1161093 | 12/2001 |
| EP | 1193955 | 4/2002 |
| EP | 1220132 | 7/2002 |
| EP | 1239392 | 9/2002 |
| EP | 1239395 | 9/2002 |
| EP | 1253542 | 10/2002 |
| EP | 1280087 | 1/2003 |
| EP | 1298945 | 4/2003 |
| EP | 1324250 | 7/2003 |
| EP | 1365604 | 11/2003 |
| EP | 1408705 | 4/2004 |
| EP | 1445703 | 8/2004 |
| EP | 1455511 | 9/2004 |
| EP | 1509024 | 2/2005 |
| EP | 1528827 | 5/2005 |
| EP | 1542482 | 6/2005 |
| EP | 1587332 | 10/2005 |
| EP | 1613102 | 1/2006 |
| EP | 1615455 | 1/2006 |
| EP | 1633100 | 3/2006 |
| EP | 1677475 | 7/2006 |
| EP | 1772822 | 4/2007 |
| GB | 2343051 | 4/2000 |
| GB | 2352856 | 2/2001 |
| GB | 2356777 | 5/2001 |
| GB | 2369218 | 5/2002 |
| GB | 2372867 | 9/2002 |

(56) References Cited

FOREIGN PATENT DOCUMENTS

| | | |
|---|---|---|
| GB | 2383149 | 6/2003 |
| GB | 2406996 | 4/2005 |
| GB | 2407002 | 4/2005 |
| GB | 2414621 | 11/2005 |
| GB | 2424546 | 9/2006 |
| JP | 2002/140272 | 5/2002 |
| JP | 2007/087138 | 4/2007 |
| JP | 2007/199821 | 8/2007 |
| KR | 2006/0011760 | 7/2004 |
| WO | 96/24213 | 8/1996 |
| WO | 97/33421 | 9/1997 |
| WO | 98/21713 | 5/1998 |
| WO | 98/37685 | 8/1998 |
| WO | 00/00916 | 1/2000 |
| WO | 00/30002 | 5/2000 |
| WO | 00/44151 | 7/2000 |
| WO | 00/62564 | 10/2000 |
| WO | 01/22748 | 3/2001 |
| WO | 01/31497 | 5/2001 |
| WO | 01/44977 | 6/2001 |
| WO | 01/52161 | 7/2001 |
| WO | 01/55892 | 8/2001 |
| WO | 01/57705 | 8/2001 |
| WO | 01/58178 | 8/2001 |
| WO | 01/63423 | 8/2001 |
| WO | 01/65411 | 9/2001 |
| WO | 01/69406 | 9/2001 |
| WO | 01/71949 | 9/2001 |
| WO | 01/72063 | 9/2001 |
| WO | 01/77840 | 10/2001 |
| WO | 01/78425 | 10/2001 |
| WO | 01/91400 | 11/2001 |
| WO | 01/93551 | 12/2001 |
| WO | 01/97539 | 12/2001 |
| WO | 02/09431 | 1/2002 |
| WO | 02/23423 | 3/2002 |
| WO | 02/31624 | 4/2002 |
| WO | 02/44834 | 6/2002 |
| WO | 02/44989 | 6/2002 |
| WO | 02/054803 | 7/2002 |
| WO | 02/059720 | 8/2002 |
| WO | 02/069585 | 9/2002 |
| WO | 02/069651 | 9/2002 |
| WO | 02/075574 | 9/2002 |
| WO | 02/080595 | 10/2002 |
| WO | 02/084895 | 10/2002 |
| WO | 02/086664 | 10/2002 |
| WO | 02/096056 | 11/2002 |
| WO | 03/015430 | 2/2003 |
| WO | 03/019845 | 3/2003 |
| WO | 03/024136 | 3/2003 |
| WO | 03/038638 | 5/2003 |
| WO | 03/049461 | 6/2003 |
| WO | 03/088690 | 10/2003 |
| WO | 2004/034671 | 4/2004 |
| WO | 2004/054205 | 6/2004 |
| WO | 2004/084532 | 9/2004 |
| WO | 2004/086791 | 10/2004 |
| WO | 2004/100470 | 11/2004 |
| WO | 2004/100521 | 11/2004 |
| WO | 2004/102993 | 11/2004 |
| WO | 2004/104867 | 12/2004 |
| WO | 2004/114109 | 12/2004 |
| WO | 2005/015806 | 2/2005 |
| WO | 2005/020578 | 3/2005 |
| WO | 2005/029769 | 3/2005 |
| WO | 2005/062637 | 7/2005 |
| WO | 2005/073863 | 8/2005 |
| WO | 2005/076650 | 8/2005 |
| WO | 2005/083980 | 9/2005 |
| WO | 2005/086927 | 9/2005 |
| WO | 2006/002869 | 1/2006 |
| WO | 2006/005001 | 1/2006 |
| WO | 2006/016189 | 2/2006 |
| WO | 2006/024003 | 3/2006 |
| WO | 2006/026505 | 3/2006 |
| WO | 2006/027407 | 3/2006 |
| WO | 2006/093284 | 9/2006 |
| WO | 2006/110446 | 10/2006 |
| WO | 2006/119481 | 11/2006 |
| WO | 2007/001118 | 1/2007 |
| WO | 2007/002025 | 1/2007 |
| WO | 2007/056698 | 5/2007 |
| WO | 2007/060451 | 5/2007 |
| WO | 2007/091089 | 8/2007 |
| WO | 2007/103263 | 9/2007 |
| WO | 2008/013437 | 1/2008 |
| WO | 2008/024852 | 2/2008 |
| WO | 2008/045867 | 4/2008 |
| WO | 2008/147919 | 12/2008 |
| WO | 2009/009507 | 1/2009 |
| WO | 2009/032856 | 3/2009 |
| WO | 2009/061914 | 5/2009 |
| WO | 2009/077888 | 6/2009 |
| WO | 2009/077888 A1 | 6/2009 |
| WO | 2009/099876 | 8/2009 |
| WO | 2009/158097 | 12/2009 |
| WO | 2009/158097 A1 | 12/2009 |

OTHER PUBLICATIONS

"Combined Search and Examination Report", for United Kingdom Patent Application No. GB 0816228.1 dated Jan. 2009, Jan. 6, 2009.

"Combined Search and Examination Report dated Mar. 7, 2008", for United Kingdom Patent Application No. GB 0721863.9, Mar. 7, 2008.

"Communication (Combined Search and Examination Report under Sections 17 and 18(3)) dated Jan. 30, 2009 issued from the United Kingdom Patent Office", in related United Kingdom Application No. GB 0818145.5, Jan. 30, 2009.

"Communication (European Search Report) dated Jun. 26, 2008", in European Patent Application No. EP 08101394, Jun. 26, 2008.

"Communication (European Search Report) dated Oct. 17, 2008 issued by the European Patent Office", in counterpart European Patent Application EP 08156763, Oct. 17, 2008.

"Communication (International Search Report along with Written Opinion of International Searching Authority) mailed Oct. 8, 2008 issued by the International Searching Authority", in counterpart International Application PCT/EP 2008/056342, Oct. 8, 2008.

"Communication (Notification Concerning Transmittal of International Preliminary Report on Patentability, International Preliminary Report on Patentability, and Written Opinion of the International Searching Authority)", issued in connection with related International Application PCT/EP 2008/051489 and mailed on Sep. 24, 2009.

"Communication (Search Report under Section 17 along with Examination Report under Section 18(3)) dated Oct. 6, 2008 issued by the United Kingdom Intellectual Property Office", in counterpart U.K. Application GB 0809321.3, Oct. 6, 2008.

"Communication (search report) mailed Mar. 24, 2009 issued from EP Office", in related European Application Serial No. 08158523.

"Communication (Search Report) mailed Mar. 5, 2009", Issued from the European Patent Office in Related European Application Serial No. 08158523.4, Mar. 5, 2009.

"Communication Pursuant to Article 94(3) EPC (European Examination Report) dated Oct. 23, 2008", issued in counterpart European Patent Application No. EP 08101394.8-1238, Oct. 23, 2008.

"Examination Report", for counterpart European Patent Application No. 08153257.4 issued Jun. 2, 2009.

"Examination Report dated Nov. 9, 2009", for European Patent Application No. EP 08159355.0, Sep. 11, 2009.

"Examination Report dated Jun. 17, 2009", issued in counterpart U.K. Application No. GB 0803273.2 by U.K. Intellectual Property Office.

"International Preliminary Report on Patentability and Written Opinion", mailed Dec. 12, 2009 in related International Application PCT/EP2008/057726.

"International Preliminary Report on Patentability and Written Opinion issued Nov. 24, 2009", in International Application PCT/EP 2008/056342, Nov. 24, 2009.

(56) References Cited

OTHER PUBLICATIONS

"International Search Report and Written Opinion mailed on Aug. 26, 2011", for PCT/US 2011/034927 titled "Content Delivery Based on User Terminal Events," to Apple Inc., Aug. 26, 2011.

"International Search Report and Written Opinion of the International Search Authority mailed Jun. 19, 2009", for International Application No. PCT/EP 2008/056069, Jun. 19, 2009.

"International Search Report and Written Opinion of the International Searching Authority mailed Feb. 11, 2009, issued by the International Searching Authority", in related International Application PCT/EP 2008/063839.

"International Search Report dated Nov. 25, 2008 issued by the International Searching Authority", in counterpart International Application PCT/EP 2008/057726.

"Notice of Allowance dated Apr. 29, 2011", U.S. Appl. No. 11/888,680.

"International Preliminary Report on Patentability and Written Opinion", (Chapter 1 of the Patent Cooperation Treaty) mailed Jan. 7, 2010 in related International Application PCT/EP2008/057728.

"International Search Report of the International Searching Authority mailed Mar. 18, 2009", PCT International Application No. PCT/EP 2008/057728, Mar. 18, 2009.

"Notification of Transmittal of the International Search Report of the International Searching Authority mailed Mar. 24, 2009", in related PCT International Application No. PCT/EP 2008/063326, Mar. 24, 2009.

"Written Opinion of the International Searching Authority mailed Mar. 24, 2009", in related PCT International Application No. PCT/EP 2008/063326, Mar. 24, 2009.

"Office Action dated Mar. 31, 2011 issue by the U.S. Patent Office", in related U.S. Appl. No. 12/080,124, Mar. 31, 2011.

"Office Action issued from the USPTO dated Aug. 20, 2009", issued in related U.S. Appl. No. 12/075,593, Aug. 20, 2009.

"Office Action issued from USPTO on Nov. 15, 2010 in U.S. Appl. No. 11/996,870", Nov. 15, 2010.

"Office Action issued Mar. 17, 2010", in related U.S. Appl. No. 12/075,593, Mar. 17, 2010.

"Office Action Issued Oct. 15, 2010 by the U.S. Patent Office", in related U.S. Appl. No. 12/080,124, Oct. 15, 2010.

"Search Report under Section 17 dated Jul. 7, 2008", in related U.K. Application GB 0803273.2.

"U.K. Search Report under Section 17 dated Mar. 10, 2008", of corresponding U.K. Patent Application No. GB 0721919.9.

"U.K. Search Report under Section 17 dated Oct. 23, 2007", in U.K. Application No. 0712280.7, Oct. 23, 2007.

"United Kingdom Search Report under Section 17 dated Mar. 10, 2004", U.K. Application No. GB 0721921.5, Mar. 10, 2004.

"Written Opinion Dated Nov. 25, 2008 issued by the International Searching Authority", in Counterpart International Application PCT/EP2008/057726.

"Written Opinion of the International Searching Authority mailed Jan. 7, 2010", International Application PCT/EP2008/057728, Jan. 7, 2010.

"XP002456252—Statement in Accordance with the Notice from the European Patent Office dated Oct. 1, 2007", concerning business methods (OJ Nov. 2007; p. 592-593), Nov. 1, 2007, 592-593.

Hillard, Dustin et al., "Improving Ad Relevance in Sponsored Search", Proceedings of the third ACM international conference on Web search and data mining, WSDM'10, Feb. 4-6, 2010, Session: Ads, pp. 361-369, ACM, New York, New York, USA, 2010., Feb. 4, 2010, 361-369.

Internet Reference, , "Specific Media Behavioral Targeting Index", Specific Media, Inc., Irvine, CA, 2010, Available online at http://www.specificmedia.com/behavioral-targeting.php.

Langheinrich, Marc et al., "Unintrusive Customization Techniques for Web Advertising", Computer Networks: The International Journal of Computer and Telecommunications Networking, vol. 31, No. 11, May 1999, pp. 1259-1272, Elsevier North-Holland, Inc., New York, NY, 1999., May 11, 1999, 1259-1272.

Mueller, Milton, "Telecommunication Access in Age of Electronic Commerce: Toward a Third-Generation Service Policy", Nov. 1996, HeinOnline, 49. Fed. Comm L.J., Nov. 1, 1996, 655-665.

Perkins, Ed , "When to buy airfare", http://www.smartertrael.com/travel-advice/when-to-buy-airfare.html?id=1628038, Nov. 21, 2006.

Regelson, Moira et al., "Predicting Click-Through Rate Using Keyword Clusters", Proceedings of the Second Workshop on Sponsored Search Auctions, EC'06, SSA2, Jun. 11, 2006, ACM, 2006., Jun. 11, 2006.

Richardson, Matthew et al., "Predicting Clicks: Estimating the Click-Through Rate for New Ads", Proceedings of the 16th international conference on World Wide Web, Banff, Alberta, Canada, May 8-12, 2007, Session: Advertisements & click estimates, pp. 521-529, ACM, 2007., May 8, 2007, 521-529.

Shaikh, Baber M., et al., "Customized User Segments for Ad Targeting", IP.com Prior Art Database Disclosure, Pub No. IPCOM000185640D, dated Jul. 29, 2009 UTC, IP.com, Amherst, NY (Available online at http://priorartdatabase.com/IPCOM/000185640, last visited Aug. 30, 2010)., Jul. 29, 2009.

Science Dictionary, , Definition of "dynamic", 2002.

World English Dictionary, , Definition of "relevant", 1998.

Wood, Cara , "Vibrant Media Debuts In-Text Video Ads", (Available at http://www.dmnews.com/vibrant-media-debuts-in-text-video-ads/article/91703/, last visited May 8, 2014), Jun. 23, 2006.

\* cited by examiner

LOCATION-INTENTION CONTEXT FOR CONTENT DELIVERY

BACKGROUND

1. Technical Field

The present disclosure relates to electronic content delivery and more specifically to intelligent targeting of invitational content to a user based on the location of a user's device.

2. Introduction

Targeted content delivery has long been an accepted means of conveying a desired message to an audience. Instead of creating a single message and delivering it to every member of the general public, content providers attempt to identify a particular segment of the population that is likely to have the greatest interest in their message. For example, a content provider might wish to convey a message regarding an offer available at a particular location. To convey this message, the content provider could send out flyers to all residents in a particular city detailing the offer and the location. However, if this offer has limited availability, then the content provider may instead narrow the message distribution to those residents who are within a specified proximity of the location. For example, the offer may only be available 6 to 9 a.m., Monday through Friday. In this case, the content provider may distribute flyers to residents whose home or work location is within a specified distance of the location. Population segmentation based on spatial and/or temporal characteristics enables content providers to optimize their resources.

The development of digital content delivery has enabled new techniques for identifying population segments based on spatial and/or temporal characteristics, for example, real-time segments characterized by mobile device users who are currently within a 1-mile radius of a specified location. However, these segmentation techniques are often overly simplistic or too broad, because they are based on limited information about the mobile device user.

SUMMARY

Additional features and advantages of the disclosure will be set forth in the description which follows, and in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present technology provides mechanisms for delivering targeted invitational content to a user based on the user's current location and/or a likelihood that the user is about to repeat a past behavior.

Through a user's interaction with the content delivery system, the delivery system is able to learn about the user and compile a user profile of user characteristics. In some cases, the user characteristics are learned when the user, or the user's device, makes a request for targeted invitational content. In other cases, user characteristic data is learned from the user's interaction with content, searches performed by the user, the user's location at various points in time, and other usage and behavior data. In still other cases, the delivery system is able to use public databases, characteristics known about the user, or characteristics known about other users to infer or derive unknown user characteristics for the user.

Of course, some user characteristics are considered personal in nature or private and such information should be handled with care. As is discussed in more detail below, such user characteristics are handled only in accordance with applicable laws and governing privacy policies. In many instances, the user is further able to opt-in or opt-out of data collection and/or usage. Further, steps can also be taken including deleting user characteristics after they have been used to infer less personal characteristics, to assign a user to targeted segment, or to select content to be delivered to the user.

The delivery system can maintain a collection of targeted segments. The targeted segments are defined using demographic, behavioral, channel, spatial and/or temporal characteristics. For example, a targeted segment can be defined to target male users, who are 19-24, and live in Northern California. Periodically, the content delivery system assigns the user to one or more targeted segments based on the learned user characteristics. As the delivery system learns new information about the user, the segment assignments can be updated. Within the content delivery system, each targeted segment can be associated with one or more items of invitational content provided by the content providers as well as one or more users. These associations allow the delivery system to select appropriate content to be served to the user upon request.

In some embodiments, the delivery system assigns the user to spatial-temporal segments. While greater detail on individual spatial-temporal segments is provided below, a user can be assigned to one or more spatial-temporal segments based on the user characteristics learned by the delivery system. Some spatial-temporal segments are defined using spatial and temporal characteristics exclusively. For example, a user is assigned to a segment because the user is at a specified location or the user is within a specified region during a specified time period. However, spatial-temporal segments can also incorporate other types of user characteristics such as demographics, behavior, inferred interests, etc. For example, spatial-temporal segments can be based on the user's current location in relation to the user's home location to determine whether the user is in or out of their comfort zone or is traveling. Spatial-temporal segments can be based on the user's recent searches as well as the user's current location to determine that the user is shopping for a particular type of item, such as groceries.

In some embodiments, spatial-temporal segments are based upon repeated behavior, such as regularly grocery shopping on Saturday afternoons or regularly attending the athletic events of a particular sports team. Such segments can be used to deliver an associated item of invitational content when the content delivery system detects that the user is substantially likely to reproduce the past behavior. For example, if it is early Saturday afternoon, and the user has been classified in a segment of late afternoon Saturday grocery shoppers, then it is likely the user will be grocery shopping soon and the delivery system can deliver the associated item of invitational content.

In some embodiments, the delivery system prioritizes the targeted segments assigned to the user so as to deliver content that is more appropriate to the user's current context as well as the content providers' and delivery system's goals.

In some embodiments, spatial-temporal segments are based on real-time information and are only applicable to the current request, such as segments associated with the user's current location. At some point, the delivery system is triggered to resolve a location associated with the user's device. In some embodiments, the trigger is the result of a request for invitational content. Furthermore, in some cases, the request can include the location associated with the user's device. In other cases, the delivery system takes an action to determine the location.

In some embodiments, the delivery system can use the resolved location to determine whether the user is within a specified proximity of a predefined landmark. The proximity calculation can be as simple as computing the distance between the resolved location and the landmark. Alternatively, the calculation may require determining if the location is contained within a specified bounded region associated with the landmark. In some embodiments, a content provider can directly associate content with a landmark. If the resolved location is within the specified proximity, the delivery system can deliver an item of invitational content associated with the landmark to the user. In some embodiments, a content provider can define a spatial-temporal segment that specifies the landmark, the proximity, and any other user characteristics. The content provider can then associate content with the spatial-temporal segment. The user can then be assigned to a segment.

In some embodiments, the delivery system can use the resolved location to assign the user to one or more real-time spatial-temporal segments. For example, a user can be assigned to a segment for users that are currently commuting between work and home.

The real-time spatial-temporal segment assignments can then be used to re-prioritize the targeted segments assigned to the user. In some embodiments, the re-prioritization is a temporary re-ordering that is only used to select invitational content for the immediate request. However, the re-prioritization can be maintained for any specified period of time. Based on the re-prioritized segment assignments, the delivery system can select an item of invitational content to deliver to the user.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. The present disclosure addresses the need in the art for improved methods of selecting targeted content presented to a user based on characteristics descriptive of the user and/or the user's interaction with one or more items of targeted content.

Figure 1:
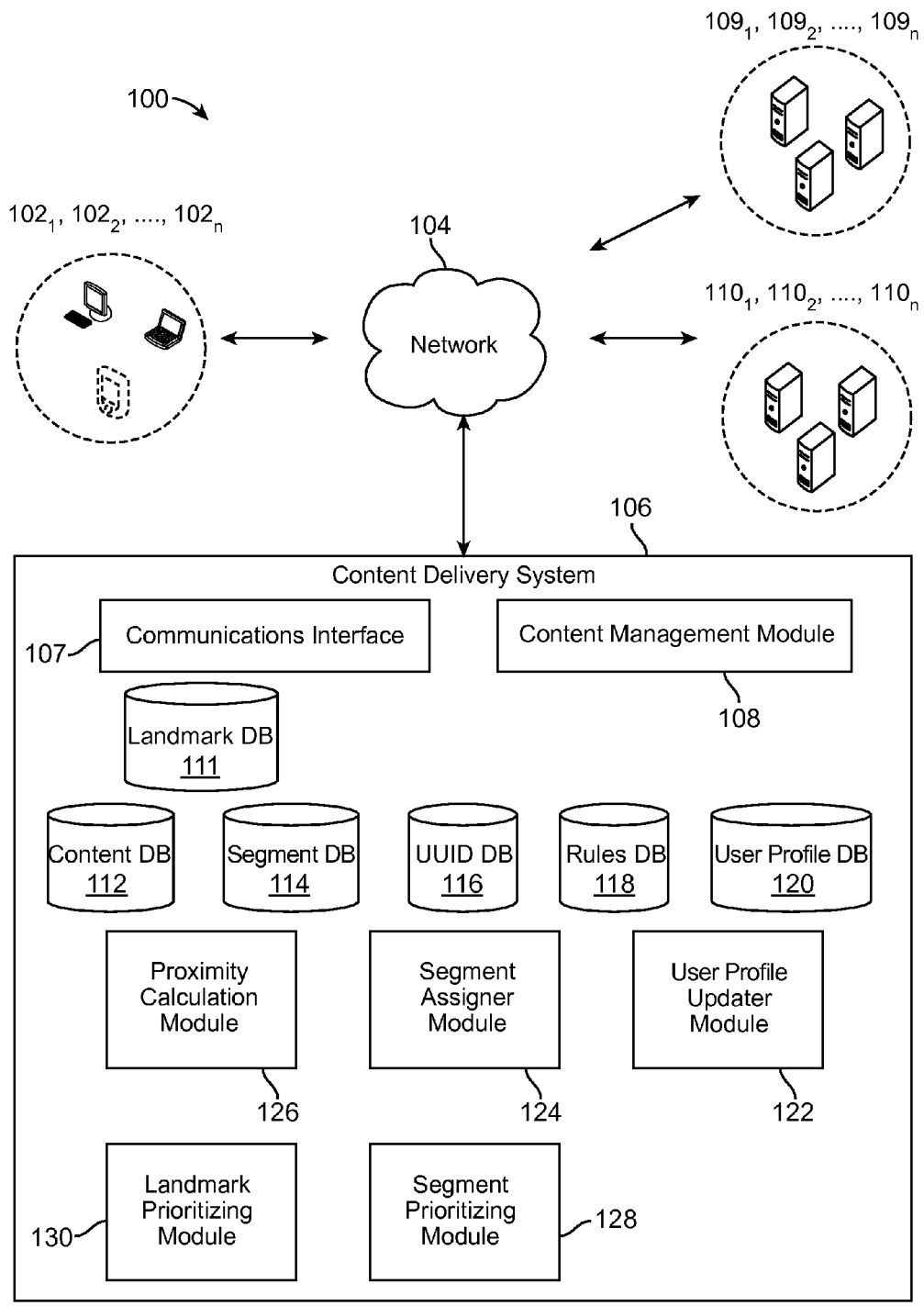
FIG. 1 illustrates an exemplary configuration of devices and a network.

The presently disclosed system and method is particularly useful for matching targeted content with a user in a manner that leads to a higher probability of conversion. An exemplary system configuration 100 is illustrated in FIG. 1, wherein electronic devices communicate via a network for purposes of exchanging content and other data. The system can be configured for use on a local area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, invitational content is delivered to user terminals $102_1 \ldots 102_n$ (collectively "102") connected to a network 104 by direct and/or indirect communications with a content delivery system 106. In particular, the content delivery system 106 receives a request for a content package of electronic-invitational content, such as a web page, an application, a game, or media, etc., from one of user terminals 102. In the various embodiments, one or more types of invitational content can be combined in a content package. The invitational content can include text, graphics, audio, video, executable code or any combination thereof. In some embodiments, the invitational content can be associated with a product or can directly or indirectly advertise a product. In some embodiments, the content package can be configured to replace or update invitational content in a content package already delivered to the user terminal.

Further, the invitational content can be active invitational content. That is, invitational content that is designed to primarily elicit a pre-defined response from the user. For example, active invitational content can include one or more types of advertisements configured to be clicked upon, solicit information, or be converted by the user into a further action, such as a purchase or download of the advertised item. However, invitational content can also include passive invitational content. That is, invitational content that is designed to primarily inform the user. In some cases, passive invitational content can include information that can lead or direct users to active invitational content. Additionally, the invitational content can be dynamic invitational content. That is, invitational content that varies over time or that varies based on user interaction with the invitational content. However, the various embodiments are not limited in this regard and the invitational content can be static invitational content that does not vary over time or that varies based on user interaction. In the various embodiments, an invitational content in a content package can be static or dynamic and active or passive. Further, various types of invitational content can be combined in a same content package.

After receiving the request for invitational content, the content delivery system 106 selects the invitational content in response to the request and transmits the assembled invitational content to the requesting one of user terminals 102. In some embodiments, the server has preselected the invitational content before the request is received. Thereafter, the server assembles a content package of invitational content and causes the content package to be delivered to the user. The content delivery system can include a communications interface 107 to facilitate communications with the user terminals 102 and any other components familiar to those of ordinary skill in the art.

The content delivery system 106 includes a content management module 108 that facilitates generation of the assembled content package, which can include invitational content. Specifically, the content management module can combine content from one or more primary content providers $109_1 \ldots 109_n$ (collectively "109") and content from one or more secondary content providers $110_1 \ldots 110_n$ (collectively "110") to generate the assembled content package for the user terminals 102. For example, in the case of a web page being delivered to a requesting one of user terminals 102, the content management module 108 can assemble a content package by requesting the data for the web page from one of the primary content providers 109 maintaining the web page. For the invitational content on the web page provided by the secondary content providers 110, the content management module 108 can request the appropriate data according to the arrangement between the primary and secondary content providers 109 and 110.

Although primary and secondary providers 109 and 110 are presented herein as separate entities, this is for illustrative purposes only. In some cases, the primary and secondary providers 109 and 110 can be the same entity. Thus, a single entity can define and provide both the primary and the secondary content.

Although the content management module 108 can be configured to request that content be sent directly from content providers 109 and 110, a cached arrangement can also be used to improve performance of the content delivery system 106 and improve overall user experience. That is, the content delivery system 106 can include a content database 112 for locally storing/caching content maintained by content providers 109 and 110. The data in the content database 112 can be refreshed or updated on a regular basis to ensure that the content in the database 112 is up-to-date at the time of a request from a user terminal. However, in some cases, the content management module 108 can be configured to retrieve content directly from content providers 109 and 110 if the metadata associated with the data in content database 112 appears to be outdated or corrupted.

In the various embodiments, the content delivery system 106 can also include a unique user identifier (UUID) database 116 that can be used for managing sessions with the various user terminal devices 102. The UUID database 116 can be used with a variety of session management techniques. For example, the content delivery system 106 can implement an HTTP cookie or any other conventional session management method (e.g., IP address tracking, URL query strings, hidden form fields, window name tracking, authentication methods, and local shared objects) for user terminals 102 connected to content delivery system 106 via a substantially persistent network session. However, other methods can be used as well. For example, in the case of handheld communications devices, such as mobile phones, smart phones, tablets, or other types of user terminals connecting using multiple or non-persistent network sessions, multiple requests for content from such devices may be assigned to a same entry in the UUID database 116. The delivery system 106 can analyze the attributes of requesting devices to determine whether such requests can be attributed to the same device. Such attributes can include device or group-specific attributes.

As described above, content maintained by the content providers 109 and 110 can be combined according to a pre-defined arrangement between the two content providers, which can be embodied as a set of rules. In an arrangement where the content delivery system assembles the content package from multiple content providers, these rules can be stored in a rules database 118 in content delivery system 106. The content management module 108 can be configured to assemble the content package for user terminals 102 based on these rules. The rules specify how to select content from secondary content providers 110 and primary content providers 109 in response to a request from one of user terminals 102. For example, in the case of a web page maintained by one of primary content providers 109, and including variable advertisement portions, the rules database 118 can specify rules for selecting one of the secondary providers 110. The rules can also specify how to select specific content from the selected one of secondary providers 110 to be combined with the content provided by one of primary providers 109. Once assembled, the assembled content package can be sent to a requesting one of user terminals 102. However, the content package is not limited to the content from content providers 109 and 110. Rather, the content package can include other data generated at the content delivery system 106.

One concern with the arrangement typically entered into by secondary content providers 110 is that they can result in invitational content of little or no interest being presented to users. As a result, even though a desired number of impressions can be achieved, the rate of response to such invitational content may be low and/or the resulting targeted audience may be incorrect or suboptimal. Additionally, in most content delivery environments, such as that of system 100, the number and type of providers 109 and 110 are generally not static. For example, the number of primary content providers 109 and the amount and type of space they provide for secondary content providers 110 can vary over time. Further, the number of secondary content providers 110 can vary over time, as well as the amount and types of space they require from primary content providers 109. Further, the types of users and user terminals of interest to the secondary content providers 110 can also vary over time. As a result, selecting optimal invitational content to present to a user can quickly become complicated in such a dynamic environment.

The various embodiments disclosed herein provide systems and methods for intelligently targeting invitational content to a user based on user characteristics. A first aspect of the present technology provides systems and methods for selecting invitational content to deliver to a user based on the user's location information. A second aspect of the present technology provides systems and methods for selecting invitational content to deliver to a user based on the predicted future movements of the user.

As used herein, the term "user characteristics" refers to the characteristics of a particular user associated with one or more of user terminals 102. User characteristics can include channel characteristics, demographic characteristics, behavioral characteristics, and spatial-temporal characteristics. Channel characteristics can define the specific delivery channel being used to deliver a content package to a user. For example, channel characteristics can include a type of electronic content, a type of device or user terminal, a carrier or network provider, or any other characteristic that defines a specific delivery channel for the content package. Spatial-temporal characteristics can define a location, a date, a time, or any other characteristic that defines a geographic location and/or a time for delivery of the content package. Demographic characteristics can define characteristics of the users targeted by the content, or associated with, the content. For example, demographic characteristics can include age, income, ethnicity, gender, occupation, or any other user characteristics. Behavioral characteristics can define user behaviors for one or more different types of content, separately, or in combination with, any other user characteristics. That is, different behavioral characteristics may be associated with different channel, demographic, or spatial-temporal characteristics. User characteristics can also include characteristics descriptive of a user's state of mind including characteristics indicative of how likely a user is to click on or convert an item of invitational content if it were displayed to the user.

Figure 2:
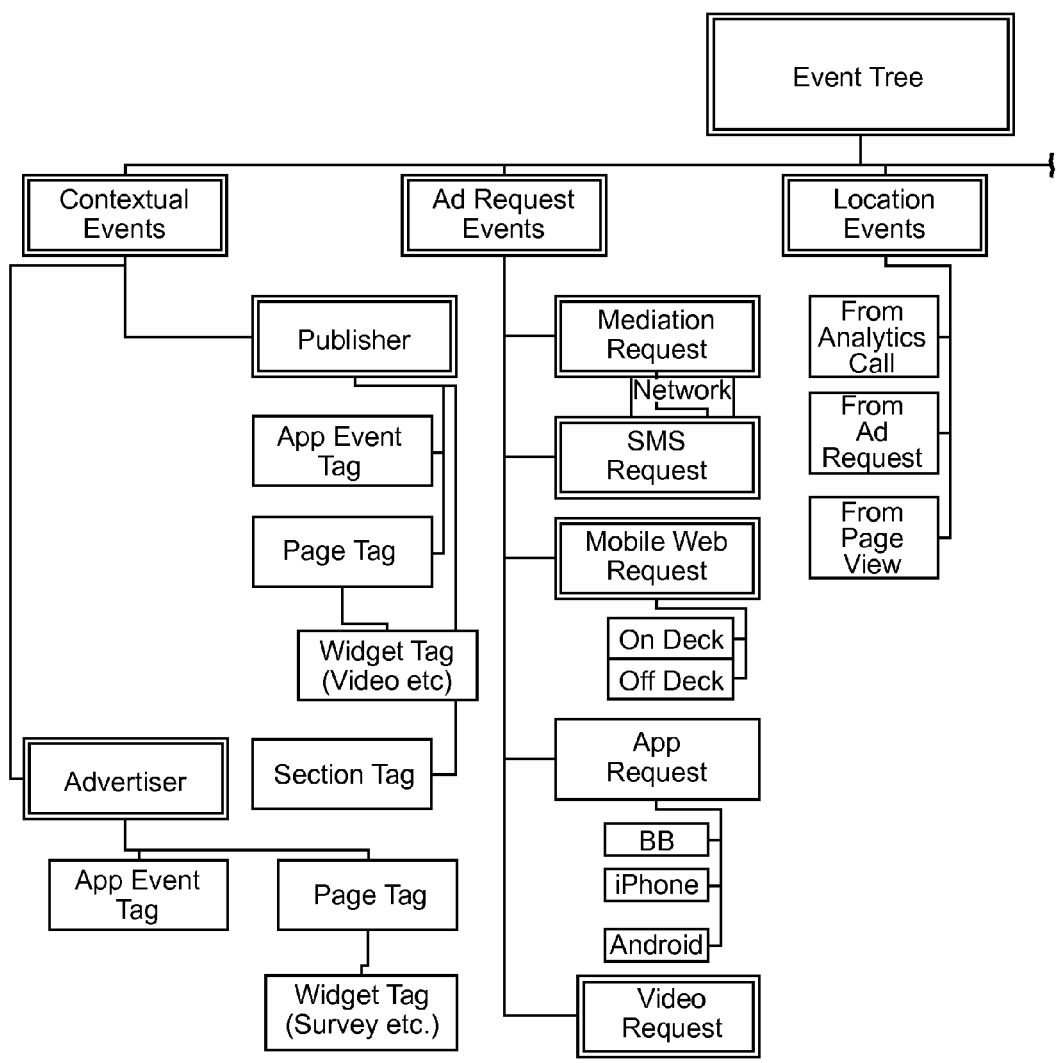
FIG. 2 illustrates a sampling of events that can be known to the content delivery network.
Figure 2:
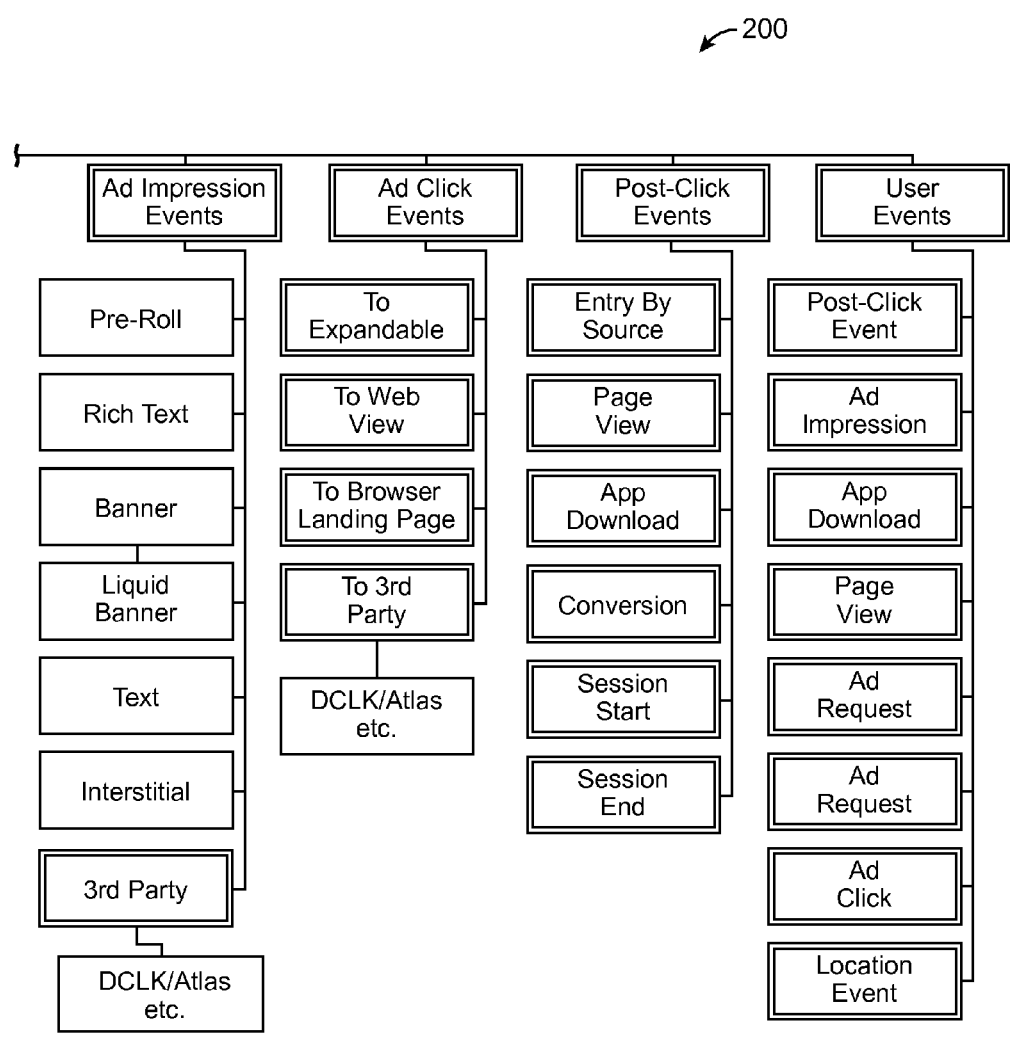

User characteristics can be learned directly or derived indirectly from a variety of sources. For example, the graph 200 in FIG. 2 illustrates a sampling of events from which the delivery system 106 can directly learn user characteristics and/or derive other user characteristics. Even though FIG. 2 illustrates a fair number of events as data sources, the figure should not be considered limiting. As will become apparent from the rest of this disclosure, the delivery system can learn of or derive user characteristics from any number of other information sources.

Referring back to FIG. 1, in some embodiments, the content delivery system 106 can include a user-profile database 120. The user-profile database 120 can, at least in part, be constructed based on recorded user characteristics related to one or more users. In some cases, the user-profile database may contain uncertain or incomplete user characteristic values.

The user-profile database 120 can be updated using a user-profile-updater module 122. In some embodiments, the user-profile-updater module 122 can be configured to add additional profile data, update profile data, fill in missing profile data, or derive uncertain user characteristic values from trusted data.

The updater module 122 can also be configured to maintain the profile database 120 to include only more recently acquired data, or to re-derive any uncertain characteristics, in order to ensure that the user profile is an accurate reflection of the current state of the user (location, state of mind, behaviors, demographics, etc. can change rapidly). For example, the updater module 122 can be configured to maintain the profile database 120 to include only data from the last two to three months. However, the updater module 122 can be configured to adjust the data in profile database 120 to cover any span of time. In some instances, the updater module 122 can update the profile database 120 in real-time. In some instances, the updater module 122 can update the profile database 120 at least every week or every day. In some cases, the delivery system 106 can receive a direct request to update one or more user profiles. The update request can come directly from the user's device or any other device capable of communicating with the delivery system 106, such as other content delivery networks or websites. In some cases, the delivery system 106 can receive an indirect request to update one or more user profiles. An indirect request can be the result of receiving new user characteristic values. An update request can occur at any time.

In some embodiments, the content delivery system 106 can include a landmark database 111. The landmark database 111 stores the locations of various landmarks. These landmarks can include places like national parks, zoos, amusement parks, hotels, retail locations, etc. A content provider can associate an item of invitational content with one or more locations in the landmark database 111. Additionally, a content provider can establish a campaign goal in which the item of invitational content is delivered to a user when the user is within a bounded area associated with the landmark. The bounded area can be defined by a city, a zip code, GPS coordinates, a specified radius originating at the landmark, etc. To determine when to deliver the item of invitational content associated with the landmark, the content delivery system 106 can include a proximity calculation module 126. The proximity calculation module 126 can take a user's current location and calculate whether the current location falls within the bounded region associated with a landmark in the landmark database 111.

In some embodiments, the content delivery system 106 can include a segment database 114 that is used to aid in selecting invitational content to target to users. The segment database 114 stores defined segments and associations between the segments and users and/or invitational content that should be targeted to users associated with the segments. A targeted segment can be defined based on one or more user characteristics or derivatives thereof, and can be associated with one or more items of invitational content. Additionally, a targeted segment can be associated with one or more users. In some embodiments, by associating a targeted segment with both a user and an item of invitational content, the delivery system can match invitational content with users. In some embodiments, the delivery system 106 can update the segment database 114 to add newly defined targeted segments or to delete targeted segments.

In some cases, a targeted segment can be as simple as a single user characteristic identifier and a single user characteristic value. For example, the common demographic identifiers of gender, age, ethnicity, or income can each be used in defining corresponding targeted segments. A characteristic value can also be assigned to the identifier. For example, the values of male, 19, Indian, and $20,000-$30,000 can be assigned to the user characteristics of gender, age, ethnicity, and income, respectively. A user characteristic value associated with a user characteristic can be a single value, multiple values, a range of values, or any combination thereof. A user characteristic value can also be a wildcard value, which indicates that any value is an acceptable match for the user characteristic.

More complex targeted segments can also be defined that consist of one or more identifiers with one or more values associated with each identifier. For example, a targeted segment can be defined to target a user with the following characteristics: gender, male; age, 19-24; location, Northern California but not San Francisco. Targeted segments can also be defined based on spatial-temporal characteristics. For example, a segment can be defined as a bounded region associated with a landmark in the landmark database 111 or a particular location and time. Additional exemplary segments are described throughout this disclosure. Furthermore, targeted segments can correspond to one or more segments that content providers are likely to easily understand, and thus, can quickly identify as being relevant to their content.

In some embodiments, the content delivery system 106 can provide a segment assigner module 124. The segment assigner module 124 can apply a set of user characteristics associated with a user (including segments to which a user has been previously assigned) to assign the user to one or more targeted segments. The assigner module 124 can obtain the set of user characteristic values from the user profile database 120 and/or from the user's activities during the current session. The assigner module 124 can assign a user to one or more defined targeted segments in the segment database 114, or alternatively, the user can be assigned to custom targeted segments defined to meet specific goals of a content provider.

Based on the assigned segments, the user profile database 120 can be updated to reflect the segment assignments. Additionally, the delivery system 106 can use the segment assignments to select targeted content. In some cases, the user profile data in the user profile database 120 can change over time, so the assigner module 124 can be configured to periodically update the segment assignments in the user profile database 120. The segment assignment update can be triggered at specified intervals, upon detection of a change in the user profile database 120 and/or upon detection of a specified activity in the delivery system 106.

Figure 3A:
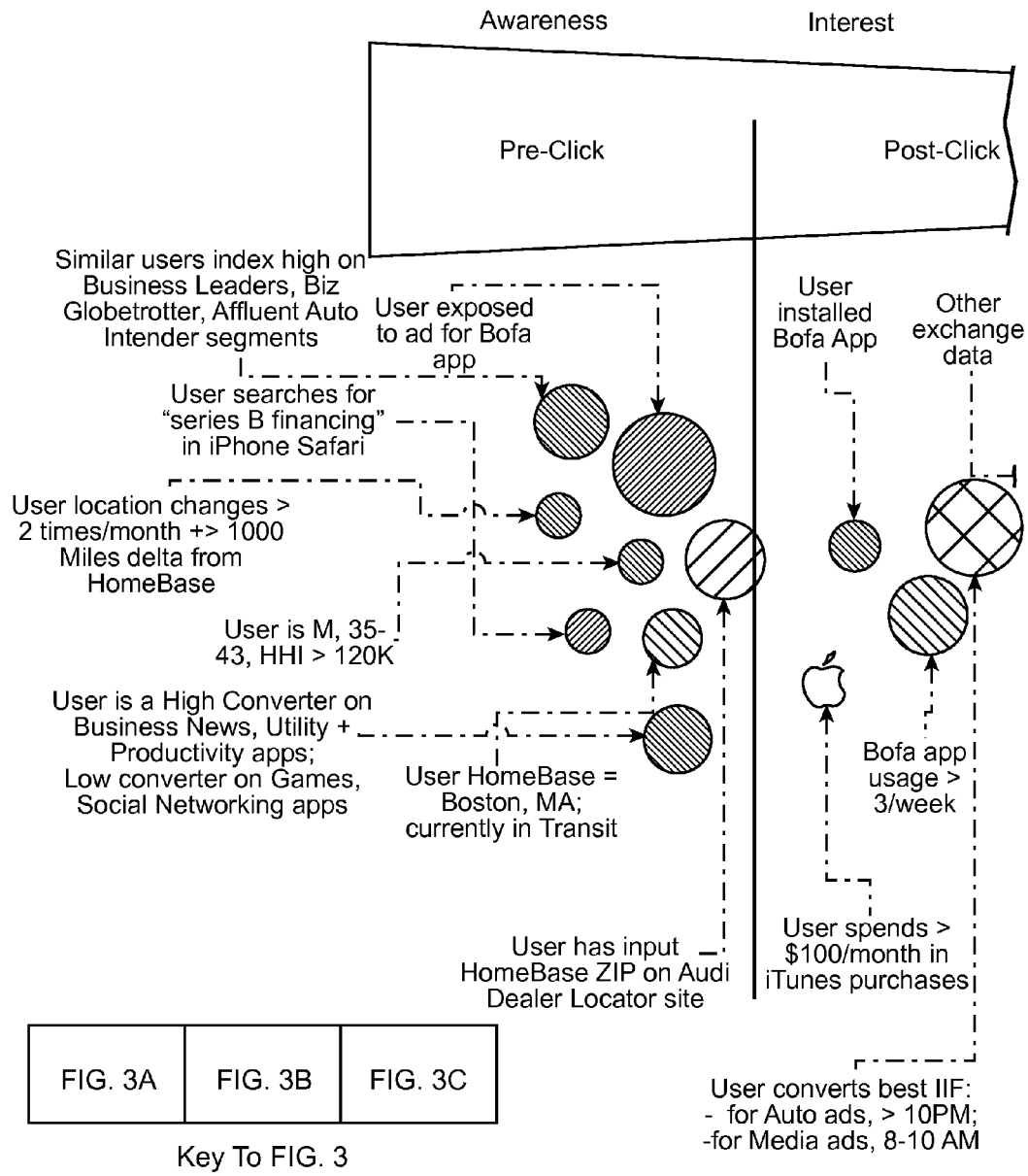
FIGS. 3A, 3B, and 3C collectively illustrate an overview of matching invitational content with users via segmentation.
Figure 3B:
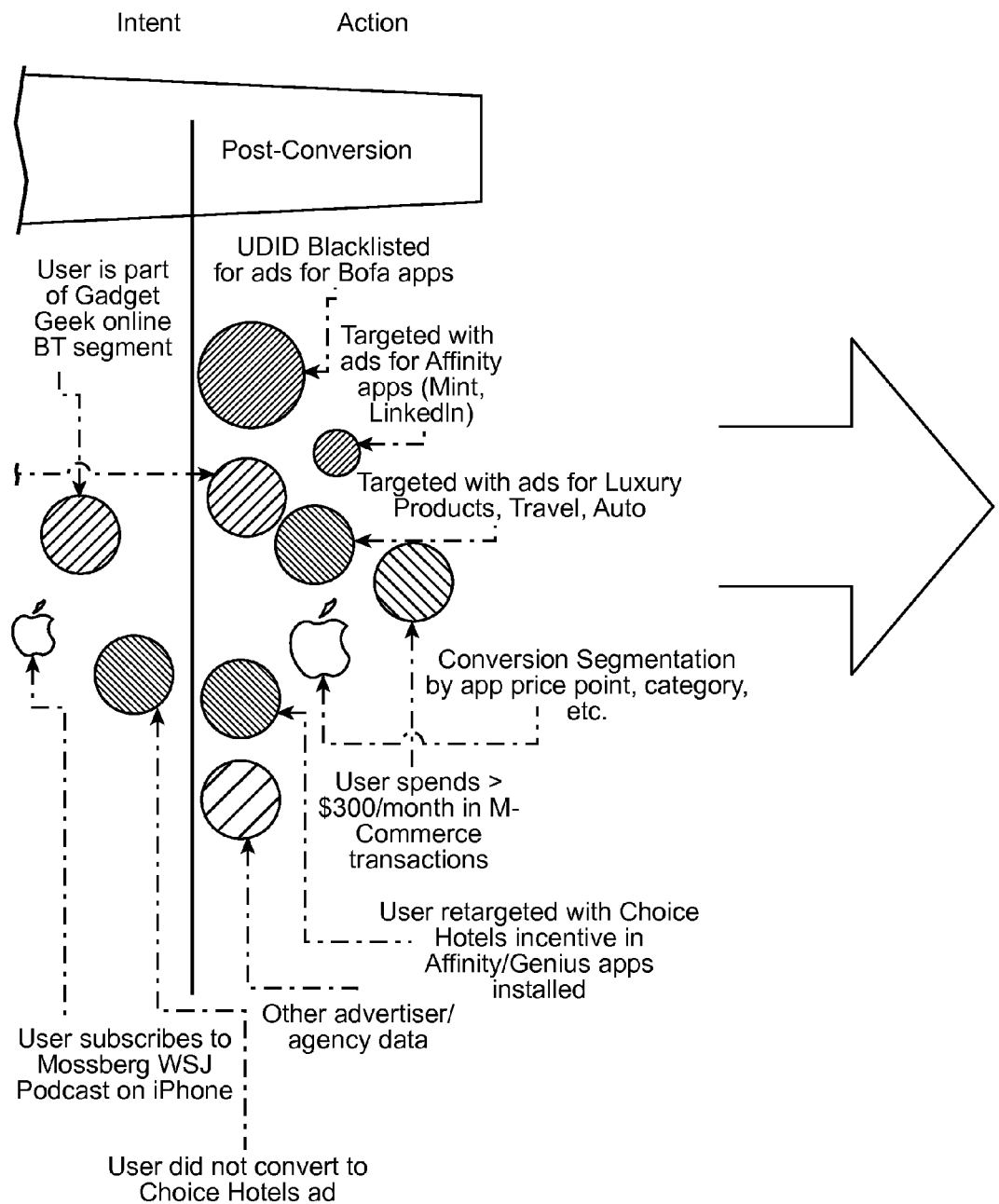
Figure 3C:
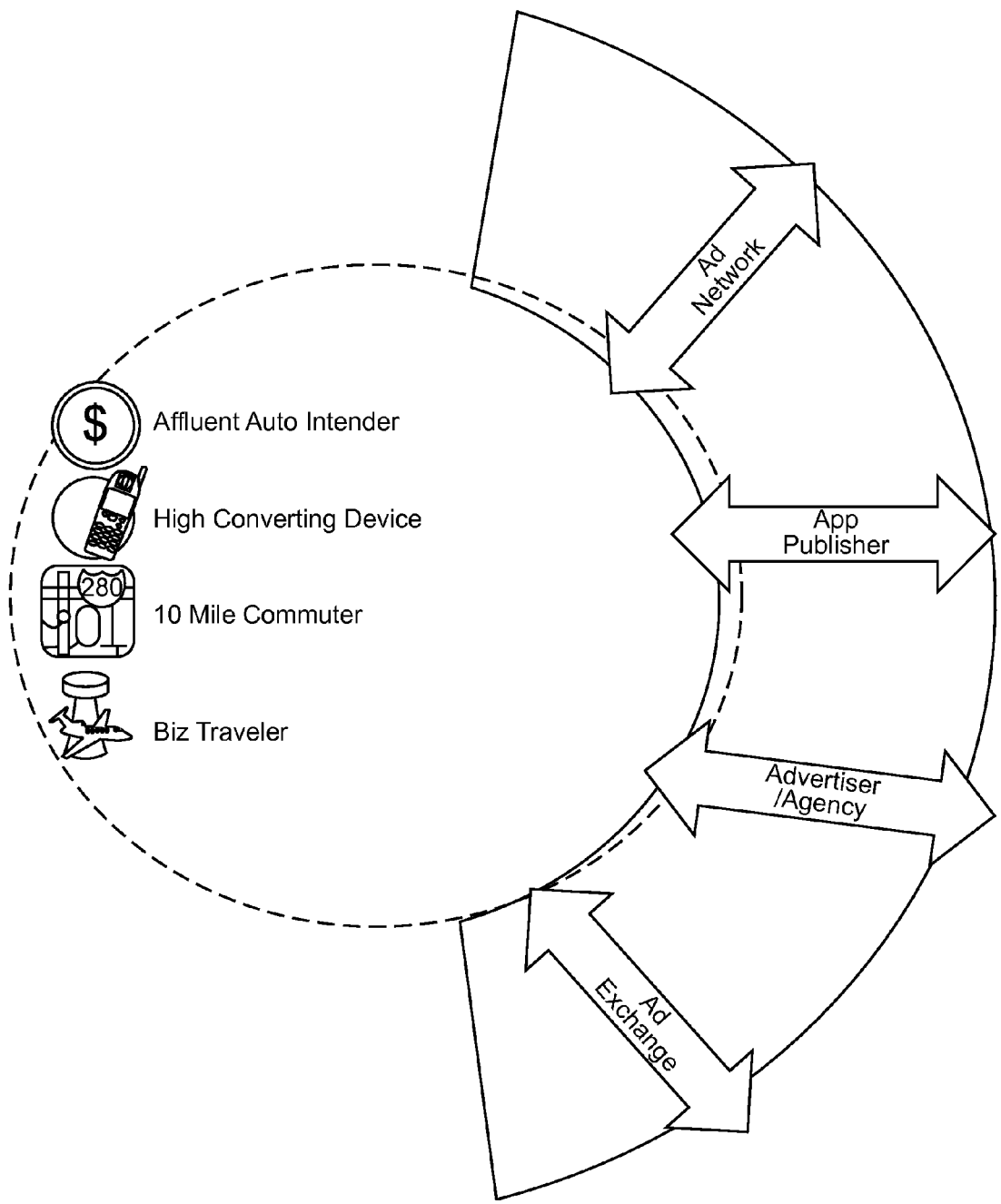

FIGS. 3A-3C are an overview of assigned segments that can be used to select targeted invitational content to be presented to a user and a process of refining the segment assignments for the user based on additional information and user characteristics learned as the user interacts with, or fails to interact with, invitational content presented to him along the conversion process. As a user interacts with content over one or more sessions, the delivery system 106 begins to gain additional knowledge about the user. This knowledge is enhanced when the user completes certain actions, such as clicking or not clicking on a link and/or completing a conversion. This information can then be used to assign the user to one or more targeted segments, such as Affluent Auto Intender, High Converting Device, 10 Mile Commuter, Biz Traveler, etc. Using the targeted segments, content providers can target invitational content that is likely to be of greater interest to the user.

In some embodiments, the content delivery system 106 can provide a segment-prioritizing module 128 for ordering and re-ordering the targeted segments assigned to a user. The prioritization can be influenced by a number of factors, which include the user's context (state of mind of a user with respect to interest in certain types of content, subject matter of content, progress along a conversion continuum, location, etc.), a content provider's campaign goals, and/or content that is currently available for display to the user. A request to prioritize the targeted segments can be made explicitly or implicitly by any component in the system 100. For example, a secondary content provider 110 can explicitly request that the content delivery system 106 prioritize the targeted segments, or the request can be implicit as part of a request for an assembled content package. The resulting prioritized list can be provided, for example, to the content management module 108, which can then use the information to assemble and deliver a content package. Additionally, the prioritized list can be stored, for example, in the user profile, for later use.

Figure 4:
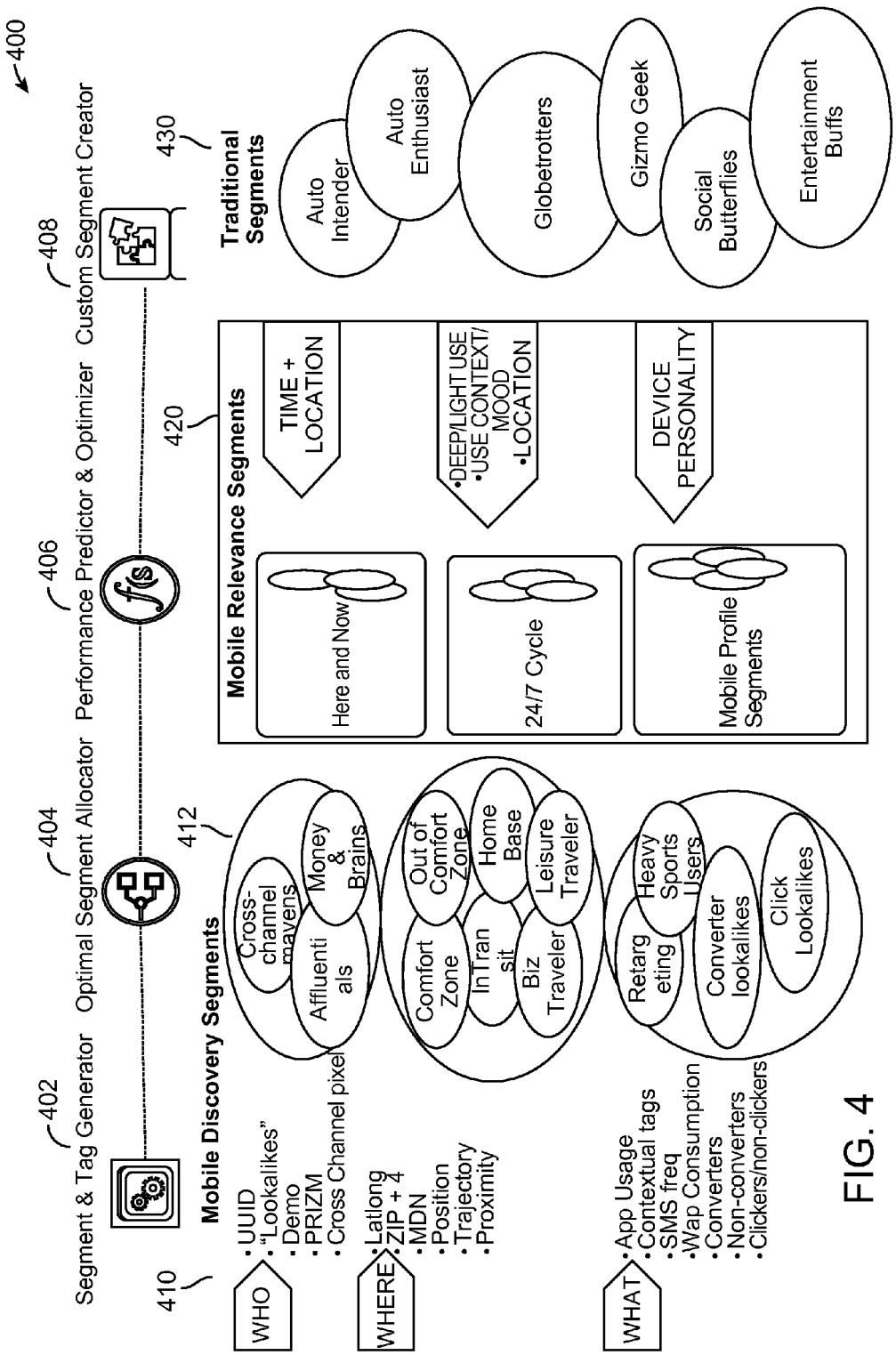
FIG. 4 illustrates an overview of an exemplary user segmentation process.

FIG. 4 is an overview of an exemplary user segmentation process 400. The delivery system 106 starts with a variety of user characteristics, such as the "who," "where," and "what" characteristics 410. Some of the user characteristics 410 can be directly obtained from the user or the user's interaction with content, such as the user's location or app usage. Other user characteristics 410 can be inferred or derived from known user characteristics. For example, it may be possible to obtain the user's location in latitude and/or longitude values, and then, the location value can be used to derive the user's current zip code or proximity to a particular landmark. Based on these characteristics, a segment generator 402, such as the segment assigner module 124, can assign the user to a variety of segments, such as the mobile discovery segments 412, mobile relevance segments 420, and traditional segments 430. For example, the user's location can be used to determine if they are in transit or in their "comfort zone," which can be defined as being near their home. Alternatively, using the user's location and some user characteristics, the delivery system may be able to determine if the user is traveling, and if that travel is for business or leisure. For example, the user might be classified as a leisure traveler if their location is associated with a resort and they have searched for locations outside their home zip code.

An optimal segment allocator 404, such as the segment prioritizing module 128, can order the segments assigned to the user so that segments that are more relevant to the user's current context are at the top of the list. The delivery system 106 can also include module(s) that carry out the tasks of a performance predictor and optimizer 406. Such module(s) can further prioritize the assigned segments by predicting user behavior and/or prioritizing segments based on campaign goals and/or context. Furthermore, the delivery system 106 can include a custom segment creator 408, such as the custom segment creator 124, which allows content providers to create custom segments.

In the various embodiments, the one or more databases described herein can be implemented using any type of data structures. Such data structures include, but are not limited to, data structures for relational databases, key/value stores, graph databases, hierarchical databases, and distributed or columnar stores. Accordingly, although the various embodiments described herein may refer to specific data structures, in other embodiments, such data structures can be substituted for any other type of data structure.

As described above, one aspect of the present technology is the gathering and use of data available from various sources to improve the delivery of advertisements or any other content that may be of interest to users. The present disclosure contemplates that in some instances, this gathered data may include personal information data that uniquely identifies or can be used to contact or locate a specific person. Such personal information data can include demographic data, location-based data, telephone numbers, email addresses, social media IDs such as TWITTER IDs, home addresses, or any other identifying information.

The present disclosure recognizes that the use of such personal information data in the present technology can be used to the benefit of users. For example, the personal information data can be used to better understand user behavior, facilitate and measure the effectiveness of advertisements, applications, and delivered content. Accordingly, use of such personal information data enables calculated control of the delivered content. For example, the system can reduce the number of times a user receives a given ad or other content and can thereby select and deliver content that is more meaningful to users. Such changes in system behavior improve the user experience. Further, other uses for personal information data that benefit the user are also contemplated by the present disclosure.

The present disclosure further contemplates that the entities responsible for the collection, analysis, disclosure, transfer, storage, or other use of such personal information data should implement and consistently use privacy policies and practices that that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after the informed consent of the users. Additionally, such entities would take any needed steps for safeguarding and securing access to such personal information data and ensuring that others with access to the personal information data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for advertisement delivery services. In yet another example, users can configure their devices or user terminals to prevent storage or use of cookies and other mechanisms from which personal information data can be discerned. The present disclosure also contemplates that other methods or technologies may exist for blocking access to their personal information data.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

The information gathered about a user, whether public or private, can be used directly or indirectly to create the UUID database 116. In many of the embodiments discussed herein, a user is first identified in the UUID database 116 to retrieve, update or write data associated with the user in the UUID database 116.

Identification of the same user in the UUID database can be performed in a variety of ways, and the methods employed to identify the user can vary, depending on the user's connection type. In one example of identifying a user in the UUID database 116, when the delivery system 106 receives a request for a content package, the request can include some identifying information associated with the requesting user terminal or the associated user. This information can then be correlated to an entry in the UUID database 116 to retrieve an identity of the user. In other configurations, the delivery system 106 can analyze the attributes of the requesting device to determine whether such requests can be attributed to a same device. In some embodiments, a user's behavior in visiting the same content channels can be used to identify the user. Of course combinations of the methods for identifying a user on one or more connection types can be used.

As mentioned above, a set of user characteristic values can also be associated with a user in the UUID database 116. In some embodiments, the set of user characteristic values are descriptive of the user. For example, the characteristic values could be demographic characteristics, such as gender, age, ethnicity, and/or income. In some embodiments, the set of user characteristic values are descriptive of the user's interaction with one or more items of content within a network of targeted content delivery channels. For example, the characteristic values can include details of the user's conversion history with respect to previously presented invitational content. The conversion history can be limited to whether or not the user converted, or, could be more detailed to include: (1) where on the conversion continuum the user abandoned the process, (2) details about the invitational content presented, and/or (3) where or when the invitational content was presented. The collected values can further include the channel, the device the user was using, the time of day, and/or day of week. In general, the values can be descriptive of any characteristics associated with the user and the user's actions, such as channel, demographic, behavioral, and/or spatial-temporal characteristics. The more extensive the data set, the more effective the targeting.

In some embodiments, the delivery system 106 is configured to deliver invitational content to a user based on the location of the user's device. In this case, targeted content delivery can be influenced by the proximity of the user's device to predefined locations and/or the user's assignment to spatial-temporal segments. Accordingly, a proximity calculation module 126 and a segment assigner module 124 can be provided for performing proximity calculations and segment assignments, respectively. The delivery system 106 can include a landmark database 111 that stores the locations of various landmarks. The proximity calculation module 126 can calculate whether the current location of the user's device falls within the bounded region associated with a landmark in the landmark database 111. The delivery system 106 can also include a segment database 114 that stores previously defined targeted segments. Having defined segments to work with, the assigner module 124 can analyze one or more user characteristic values and one or more targeted segment definitions to determine if the user fits within a population segment defined by a targeted segment. The delivery system 106 can then use the calculated proximity information and/or the segment assignments to select invitational content to send to the user.

Figure 5:
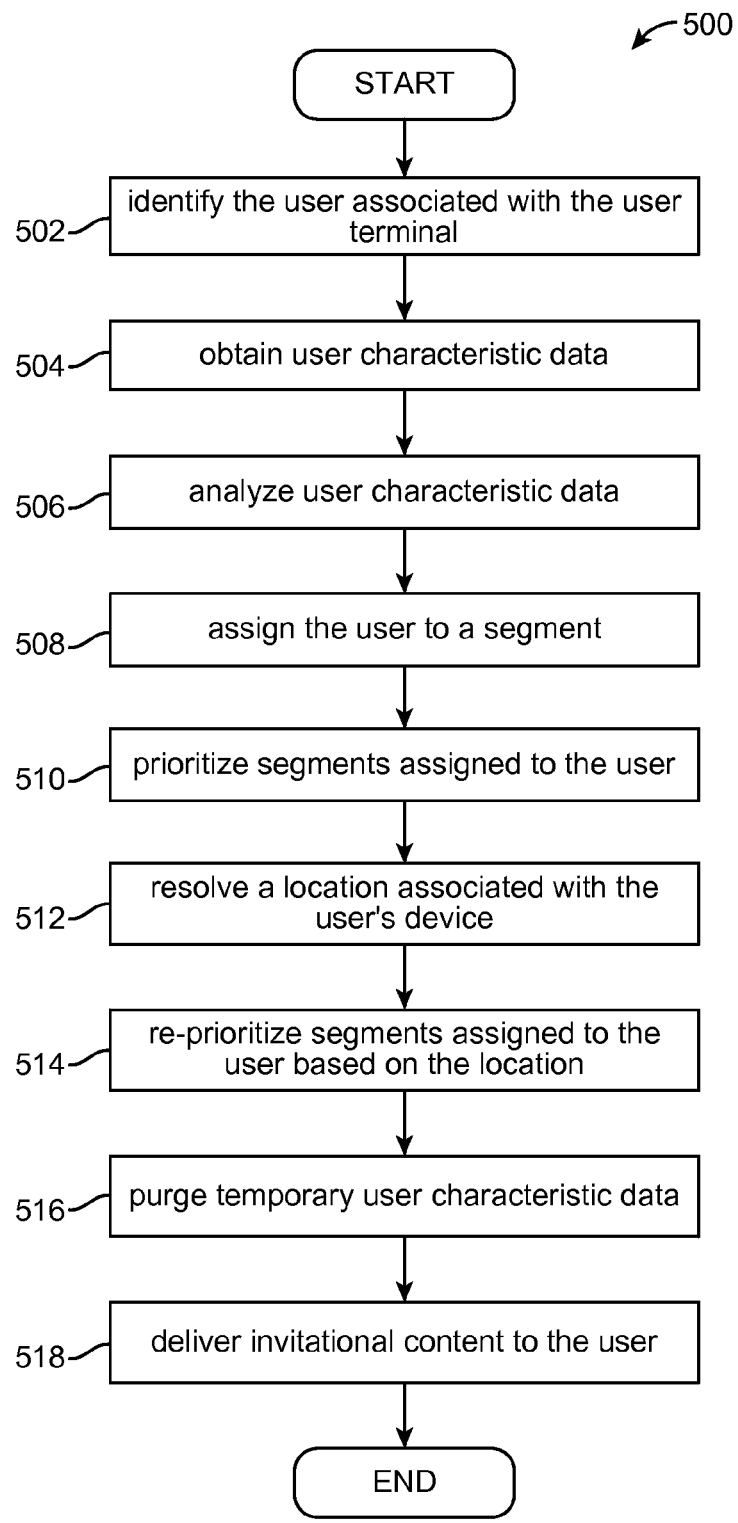
FIG. 5 illustrates an exemplary method embodiment for delivering targeted invitational content based on location information.

FIG. 5 is a flowchart illustrating steps in an exemplary method 500 for delivering invitational content to a user based on location information. For the sake of clarity, this method is discussed in terms of an exemplary system such as is shown in FIG. 1. Although specific steps are shown in FIG. 5, in other embodiments, a method can have more or fewer steps than shown.

First, the delivery system 106 identifies the user associated with the user terminal (502). This identification can be performed in many ways. For example, as described above, when the delivery system 106 receives a request for a content package, the request can include some identifying information associated with the requesting user terminal or the associated user. This information can then be correlated to an entry in the UUID database 116 to retrieve an identity of the user. In other configurations, the user can be identified by analyzing the requesting device's attributes in order to determine whether such requests can be attributed to a same device, also as described above. Other methods can also be used.

Meanwhile, the delivery system 106 can obtain user characteristic data descriptive of the user and/or the user's interaction with one or more items of invitational content within a network of targeted content delivery channels (504). The data can include any number of characteristics associated with a user's interaction with invitational content or any contextual characteristics such as channel, demographic, behavioral, and/or spatial-temporal characteristics. As described above, the delivery system 106 can include a user profile database 120. A user profile can include information descriptive of the user and/or the user's interaction with various items of content. In this case, the delivery system 106 can obtain user characteristics from the user's profile in the user profile database 120. The delivery system 106 can also use real-time user characteristic values based on the identified user's activities during the current session and/or data provided as part of a request for invitational content.

Periodically, the delivery system 106 analyzes the user characteristic data (506). In some cases, one or more user characteristic values used to assign a user to a targeted segment of the population are missing or uncertain. To address this issue, the delivery system 106 can infer/derive a user characteristic value from trusted values. The delivery system 106 can use a variety of sources to infer/derive a user characteristic value. In some embodiments, the delivery system 106 can infer a user characteristic value by comparing one or more trusted user characteristic values with a database of data and then inferring the user characteristic value from the comparison. The delivery system 106 can also infer a user characteristic value by comparing the user characteristic data associated with the user with a collection of user characteristic values collected from a population of users. Using this method, the delivery system can identify other users with similar values and substitute their values for the uncertain values of the user. Additionally, there are some characteristics that the delivery system 106 can infer from other user characteristics known about the user. For example, the delivery system 106 may be able to derive a user's gender from a known preferred salutation, first name, and/or purchase history. The delivery system 106 can store any newly obtained, inferred, and/or derived user characteristic values in the user profile database 120.

Whether the delivery system 106 considers a value uncertain can vary depending on the configuration of the system. For example, in some cases, only missing values are considered uncertain. However, in other cases, the delivery system 106 may consider a value uncertain if the delivery system 106 is not convinced the value accurately characterizes the user in the current context, or, if it has an associated confidence score less than a specified threshold value. Likewise, whether a value is trusted depends on the configuration of the delivery system 106. In some configurations, any value may be trusted, while in others, only values with an associated confidence score greater than a threshold value may be considered trusted. Additionally, in some configurations, the delivery system 106 can detect that certain values may not be completely accurate. For example, the delivery system 106 may be able to detect that a user has entered a business address for their home address, and thus, not consider the value trusted for the purpose of deriving other user characteristic values or assigning a user to a targeted segment. For example, a user may enter a home address of 1 Infinite Loop, Cupertino, Calif. 95014, which is known to be a commercial address.

As part of inferring/deriving a user characteristic value, the delivery system 106 can assign a confidence score to the derived value, where the confidence score represents the likelihood that the particular characteristic is valid and/or correct. For example, a characteristic value can be assigned a value in the range [0,1], where "0" indicates no confidence and "1" indicates full, or almost full, confidence. Other relative indicators of confidence can also be used such as a percentage. The confidence score can be calculated in a number of different ways and can depend on a variety of factors, such as the particular user characteristic, how the characteristic is obtained, the number of characteristics considered, the number of users considered, etc. The delivery system 106 can then use the confidence score when deciding whether to use a derived value in assigning a user to a targeted segment.

In some cases, the delivery system 106 can analyze the user characteristic data related to the identified user for demographic, behavioral, and/or spatial-temporal patterns. These patterns can indicate a user's present or long-term intent and/or interests. Some examples include identifying the user's propensity to convert or click on an item of invitational content; identifying when a user is about to travel, or is traveling; identifying when a user is researching a product or content; etc. In some embodiments, machine learning algorithms and predictive algorithms can be used to predict user intent and interest. Additionally, the analysis step can be performed using one or more rules.

From the analysis of the user characteristic data, the system can infer interest in various products or user intent and assign the user into one or more segments representative of that interest or intent (508). The segment assigner module 124 can assign the user to a targeted segment based on the user characteristic values. In some embodiments, a characteristic value can have an associated confidence score, and the delivery system 106 can be configured to only consider characteristic values that exceed a specified threshold value when assigning a user to a targeted segment. In some embodiments, classifying algorithms can be used for the segmentation. In addition to the more traditional segments based upon demographics, such as age, gender, income, and ethnicity, the following are several descriptive examples of possible targeted segments:

"Cross-channel Mavens—users that access content on a cellular network, wireless network, and wired network in the same session more than 3 times per week.

Affluentials—users are both affluent and influential; have a household income greater than $120,000 and that complete more than 3 conversions per week.

Money and Brains—users that have a household income greater than $150,000 and interact with financial and technology content in more than 10 sessions per week.

"Heavy Sports Users"—users whose interactions via a cellular or wireless network consist of more than 80% sports content; and the users spend more than 4 minutes per day interacting with sports content.

"Converter or Click Lookalikes"—users who match the behavior pattern of users who have completed the associated conversion action for the content.

"Gizmo Geek"—users who (1) have more than 5 page views on technology sites; (2) have 4 utility applications; and (3) have clicked on a mobile site and targeted laptop product category in the past 5 days.

"Auto Enthusiasts"—users who have more than 5 page views on auto sites in the past 14 days.

"Affluent Auto Intenders"—users that have a household income greater than $120,000, have interacted with auto sites in more than 10 sessions in the past 5 days, and optionally have viewed auto reviews and/or auto videos.

"Social Butterflies—users who interact with a social networking application more than 5 times in a single day.

"Entertainment Buffs—users who have more than 5 page views on entertainment sites in a week, more than 3 video applications, and more than 4 music purchases per week; and for whom more than 70% of cellular network usage is video.

"Tween Device Persona"—users who utilize portable multimedia player devices that are not connected to a cellular network.

"Life Stage"—users who can be segmented based on their identification as a parent, child, adult, husband, and/or wife.

"High, Average, Low Spenders"—users whose spending habits, in relation to other users of the system, on a specified category of goods, place them in the top 1-3 deciles ("High Spenders"), 4-7 deciles ("Average Spenders"), and 8-10 deciles ("Low Spenders").

"High, Average, Low Purchase Frequency"—users whose purchase frequency, in relation to other users of the system, of a specified category of goods over the last 30 days, places them in the top 1-3 deciles ("High Purchase Frequency"), 4-7 deciles ("Average Purchase Frequency"), and 8-10 deciles ("Low Purchase Frequency").

As with the derived user characteristic values, the delivery system 106 can assign a confidence score to the targeted segment assignment. In this case, any confidence scores associated with any user characteristic values can be factored into the confidence score for the segment assignment. The delivery system 106 can use the segment assignment confidence score in determining whether the segment should be used in selecting invitational content for the user. For example, if the confidence score is below a specified threshold, the delivery system 106 might not use the segment assignment for selecting invitational content. The delivery system 106 can update the user profile database 120 to reflect the segment assignments.

In some cases, it may be possible for a user to be grouped into many segments, and thus be eligible to receive targeted content associated with any of those segments. However, some segments can be more important or valuable and/or be associated with more content. Therefore, the delivery system 106 can be configured to prioritize the one or more targeted segments associated with the user (510). To create the prioritized ranking of segments, the segment prioritizing module 128 can be configured to take a list of targeted segments and order the list based on a specified goal. The goal can be specified by a content provider and/or the delivery system 106. The goal can specify an objective such as a maximum budget not be exceeded, a click-through rate, an effective cost per thousand impressions, a target conversion rate, a target fill rate, a user engagement rate, etc. Further, a goal can specify more than one objective. In this case, the delivery system 106 can be configured to create a balance between the objectives. The prioritizing module 128 can analyze the list of targeted segments assigned to a user and determine the ideal ordering of those segments with respect to the associated objective. Further, the prioritizing module 128 can consider the segment assignment confidence score when performing the ranking. For example, those segments with a confidence score less than a specified threshold can be ranked lower, or not at all, even if the segment is a better match.

The segment prioritization can occur at various times. For example, the delivery system 106 can be configured to trigger the prioritizing module 128 at specified intervals. Alternatively, the prioritizing module 128 can order the segments when the delivery system 106 receives a request for invitational content. In some configurations, the prioritizing module 128 can monitor the user characteristics and/or objectives and perform the prioritization when a change in the user characteristics and/or objectives is detected. After prioritizing the segments, the delivery system 106 can use the ordered list to aid in selecting invitational content to deliver to the user.

At some point, the delivery system 106 is triggered to resolve a location associated with the user's device (512). The location associated with the user's device can be provided as a latitude and/or longitude value. However, other methods of expressing location are also possible, such as zip code, city, state, etc. The location value can be provided as part of the request for a content package, or can be obtained through other interaction with the user.

In some embodiments, the delivery system 106 can use the resolved location to determine whether a user is within a specified proximity of a predefined landmark. Based on the resolved location, the proximity calculation module 126 calculates the proximity to one or more landmarks in the landmark database 111. The proximity calculation can be as straightforward as computing the distance between the resolved location and the location of the landmark using latitude and/or longitude values. The particular calculation required can depend on how the bounded region associated with the landmark is defined. For example, if the bounded region is defined using a set of location points, the delivery system 106 may have to determine if the location falls within the bounded region. Alternatively, the region could be defined as a particular zip code, which could require the delivery system to map the resolved location to a zip code.

Depending on the number of landmarks in the landmark database 111, calculating the user's proximity to each landmark every time the location of the user's device changes may be prohibitively costly. In this case, the delivery system 106 can identify a subset of the landmarks, and only perform the proximity calculation for those landmarks. For example, the subset could include all landmarks in the same zip code, city, state, etc, as the user. Alternatively, the delivery system 106 can limit calculating the proximity by only performing the calculation when a change in the location of the user's device has exceeded a specified distance or when a specified period of time has expired.

In some embodiments, the delivery system 106 can directly use the proximity calculation to select invitational content to deliver to the user. For example, a content provider can establish a campaign goal that associates one or more items of invitational content with a particular landmark. Then, using geo-fencing, the content provider can further specify a bounded region to associate with the campaign goal, for example a region around a particular landmark. When the resolved location falls within the bounded region, the delivery system 106 can select an item of invitational content associated with the landmark to deliver to the user. In some configurations, a content provider can also specify a targeted segment as part of the campaign goal. The targeted segment can be used so that the identified user not only has to be within a specified proximity of the landmark, but also must possess certain characteristics.

In some cases, the user can be within the specified proximity of more than one landmark. When this occurs, the delivery system 106 can deliver invitational content associated with each of the landmarks. However, the delivery system 106 can also be configured to deliver a single item of invitational content. In this case, the delivery system 106 can be configured to create a prioritized list of the eligible landmarks. Accordingly, a landmark prioritizing module 130 can be provided for performing the prioritization. The landmark prioritizing module 130 can be configured to take a list of eligible landmarks and order the list based on a specified goal. The goal can be specified by a content provider and/or the delivery system 106. The goal can specify an objective, such as a maximum budget not to be exceeded, a click-through rate, an effective cost per thousand impressions, a target conversion rate, a target fill rate, user engagement rate, etc. Further, a goal can specify more than one objective.

In some embodiments, the landmark prioritizing module 130 can consider user characteristics in the prioritization. For example, a campaign goal can specify one or more targeted segments, which the delivery system 106 can factor into the landmark prioritization. The landmark prioritizing module 130 can also consider the targeted segment prioritization performed in step 510. Further, the delivery system 106 can consider the user's context when ranking the landmarks. In this case, the delivery system 106 can rank higher those landmarks that are more relevant to the user's current context. For example, if the delivery system 106 detects that the user is traveling, then the delivery system 106 can rank tourist-related landmarks higher. The delivery system 106 can then select an item of invitational content associated with the highest-ranked eligible landmark. In some cases, even though the resolved location is within the proximity of one or more landmarks, the delivery system 106 may not select invitational content using the proximity calculation method, because the delivery system 106 determines that the available content is not of interest to the user, it will not satisfy a campaign goal, etc.

In some embodiments, a bounded region associated with a landmark in the landmark database 111 can be used to define a spatial segment. For example, a content provider could define a targeted segment that specifies the bounded region of a 1-mile radius of the Golden Gate Bridge in San Francisco, Calif. When the resolved location is within the bounded region, the delivery system 106 can assign the user to the associated targeted segment. Additionally, a content provider can specify user characteristic values in addition to the bounded region. For example, a content provider could define the following spatial-temporal segment: bounded region—1-mile radius of the Golden Gate Bridge; date and day part—weekend between 12 and 4 p.m.

In some embodiments, the delivery system 106 can use the resolved location to assign the user to one or more spatial-temporal segments. To assign the user to a spatial-temporal segment, the delivery system 106 analyzes the user characteristic data related to the identified user, along with the resolved location, to identify spatial-temporal patterns. Spatial-temporal patterns that can be identified based on the user characteristic data include, for example, patterns that can indicate a user's present intent or interest based on their current location. Some examples include identifying when a user is traveling; when a user is in transit; when a user is commuting; when a user is grocery shopping; etc. The analyzing step can be conducted using one or more rules, of which some examples are below.

From the analysis of the user characteristic data, the delivery system 106 can categorize the user into a spatial-temporal segment representative of the user's present intent or interest. In some embodiments, the spatial-temporal segments can be rather straightforward, such as categorizing the user based on the current city, current zip code, or current time zone of the resolved location, or based on a combination of the current location and the date, day, and/or time of day. However, more specialized spatial-temporal segmentation can be accomplished through classifying algorithms. FIGS. 6-11 provide illustrative examples of spatial and spatial-temporal segmentation.

Figure 6:
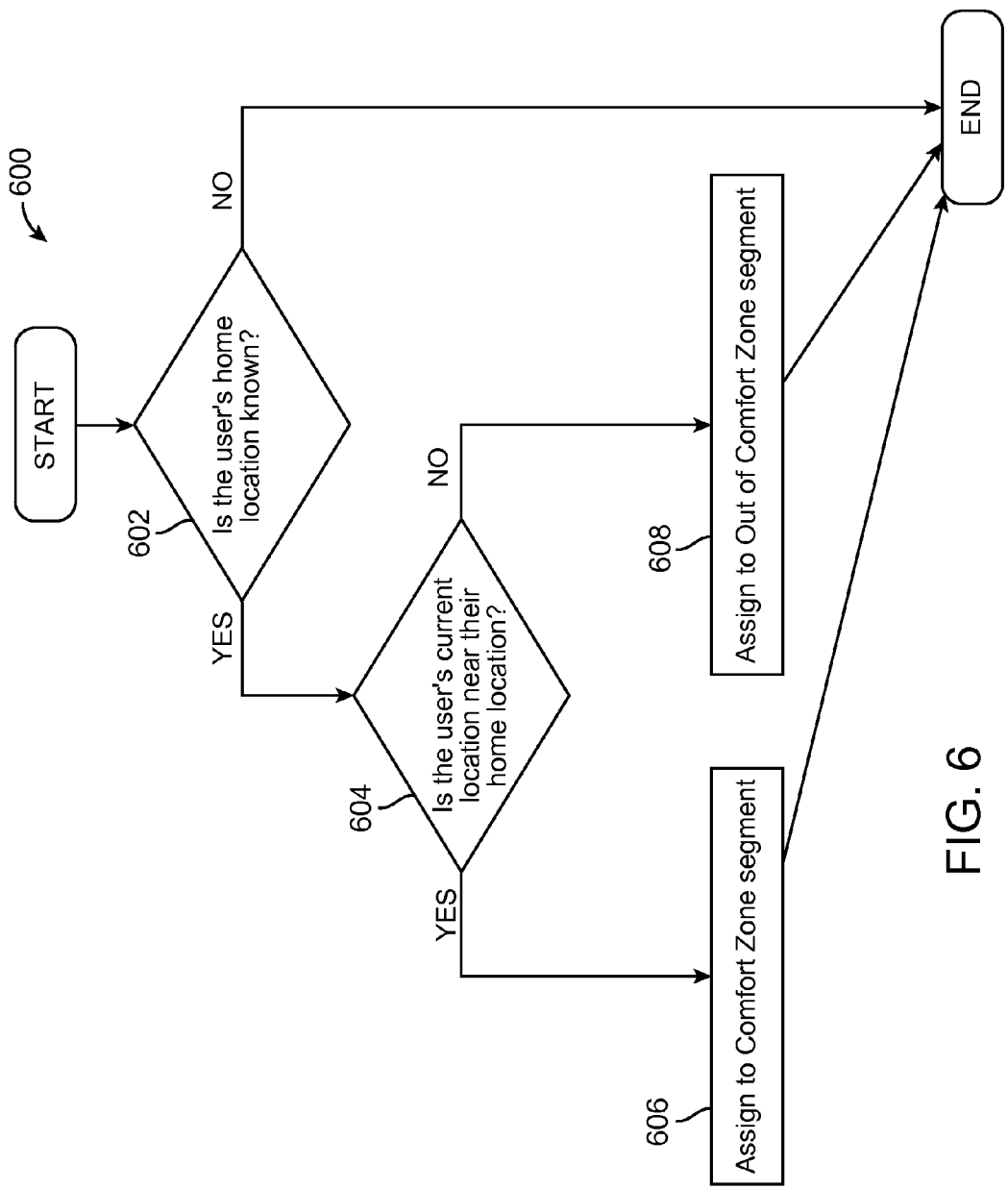
FIG. 6 illustrates an exemplary method of assigning a user to a spatial-temporal segment based on whether the user is currently inside or outside their comfort zone.

FIG. 6 illustrates an example of assigning a user to a spatial segment. The method 600 in FIG. 6 can be used to assign a user to a segment based on whether the user is currently inside or outside their comfort zone. The method 600 begins at 602, where the delivery system 106 checks if the user's home location is known. In some cases, the user's home location might be stored in the user's profile in the user profile database 120. For example, the delivery system 106 may be able to access an account database, such as the ITUNES account database (Apple Inc. of Cupertino, Calif.), to obtain the user's billing information. Alternatively, the delivery system 106 may be able to derive the user's home location from other user characteristics. For example, through an analysis of the user characteristic data, the delivery system 106 may be able to detect that the user is in the same area every day from 7 p.m. to 7 a.m. and infer that the area is the user's home location. The delivery system 106 can be configured to express the home location in a number of different ways. For example, in some configurations, the home location may be expressed as a latitude and longitude value. Alternatively, the home location may be expressed as a zip code. Other expressions are also possible. However, the most general classification that still allows the system to meet its goals is the most desired. For example, in most instances, the user's home address or location is not desired over sub-division, city or zip code values.

If the delivery system 106 is unable to obtain the user's home location, then the delivery system 106 is unable to determine whether the user is inside or outside of their comfort zone. Thus, the method 600 is retried at a later time. However, if the home location is known, then the delivery system 106 checks if the user's resolved location is proximate the user's home location (604). Whether a user is proximate is based on the configuration of the delivery system 106. For example, if the user's home location is expressed as a latitude and longitude value, then "proximate" can be defined as being within a specified distance of the home location, such as a 1-mile radius. However, if the user's home location is expressed as a zip code, then "proximate" can be defined as being within the same zip code. Other expressions of home location or definitions of proximate are also possible. If the resolved location is proximate the user's home location, then the delivery system 106 can assign the user to the Comfort Zone segment (606). Otherwise, the delivery system 106 can assign the user to the Out of Comfort Zone segment (608).

Figure 7:
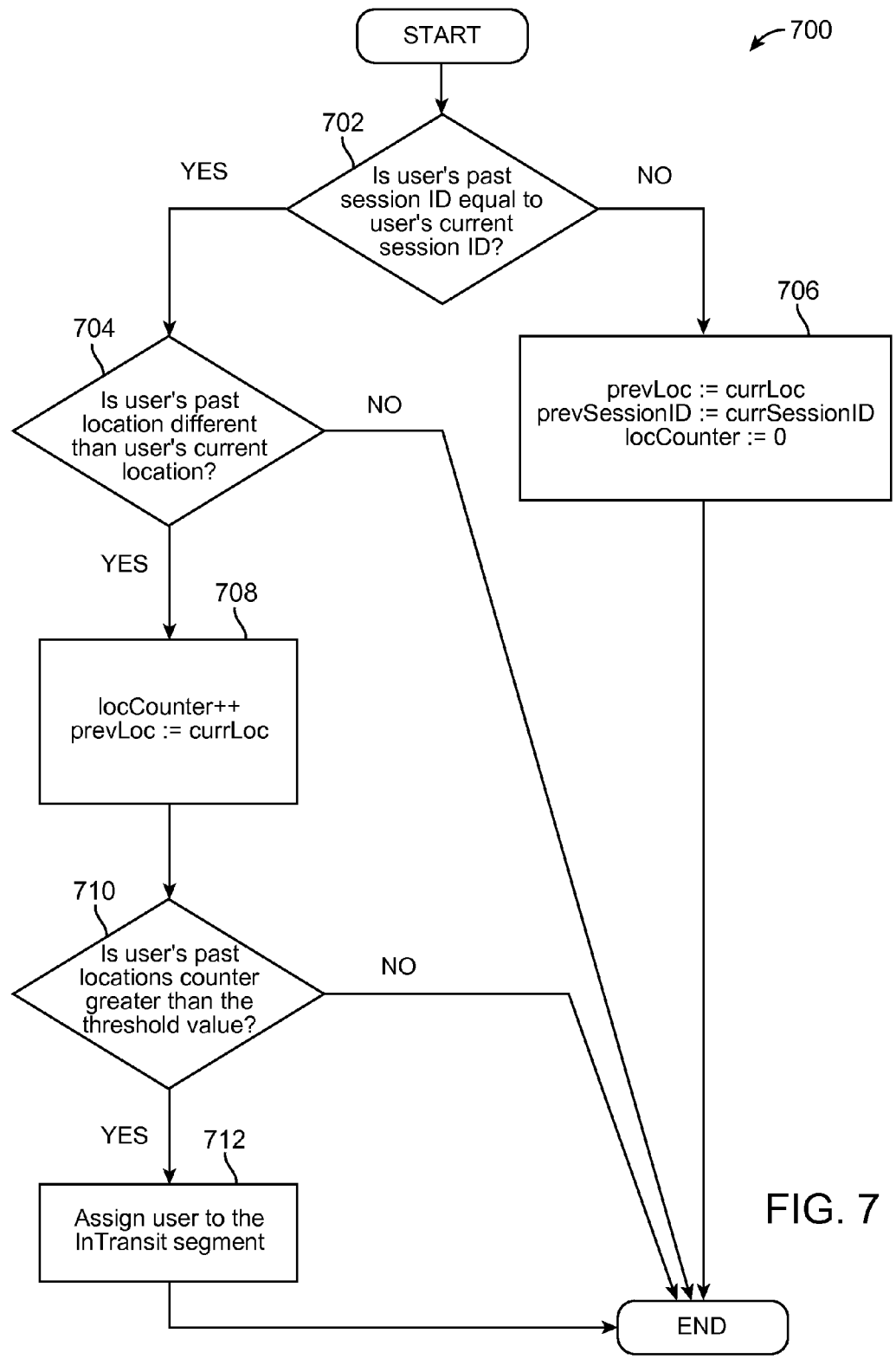
FIG. 7 illustrates an exemplary method of assigning a user to a spatial-temporal segment based on whether the user is in transit.

FIG. 7 illustrates another example of assigning a user to a spatial segment. The method 700 in FIG. 7 can be used to assign a user to a segment based on whether the user is in transit. The method 700 begins at 702 where the delivery system 106 checks if the user's current session ID is the same as the session ID used during the user's previous interaction with the delivery system 106. The user's previous session ID can be maintained by the delivery system 106 in a number of different ways. For example, the previous session ID can be maintained in the user's profile in the user profile database 120.

If the previous session ID and current session ID differ, the delivery system 106 can reset the variables used to determine whether the user is in transit (706). For example, in method 700, the delivery system 106 uses three variables: prevLoc (previous location), prevSessionID (previous session ID), and locCounter (location counter). The previous location and previous session ID variables are updated to current location and current session ID values, respectively, and the location counter is reset to zero. As with the previous session ID, the delivery system 106 can maintain the previous location and location counter in a number of different ways, such as by storing the values in the user profile database 120.

If the previous session ID and current session ID are equal, the delivery system 106 checks if the resolved location is different than the resolved location used during the user's previous interaction with the delivery system 106 (704). If the values are the same, then the user's device has not moved. Thus, there is no change in the user's segment assignment, and the method 700 is complete. However, if the values differ, then the user's device has moved and the delivery system 106 updates the location counter and previous location variables (708). The location counter has increased by 1, because the user has moved to a new location and the previous location is updated to the current location.

The delivery system 106 then checks if the location counter value is greater than the specified threshold value used to define when a user is considered in transit (710). If the value has exceeded the threshold value, the delivery system 106 assigns the user to the InTransit segment (712). Otherwise, there is no change in the user's segment assignment.

Figure 8:
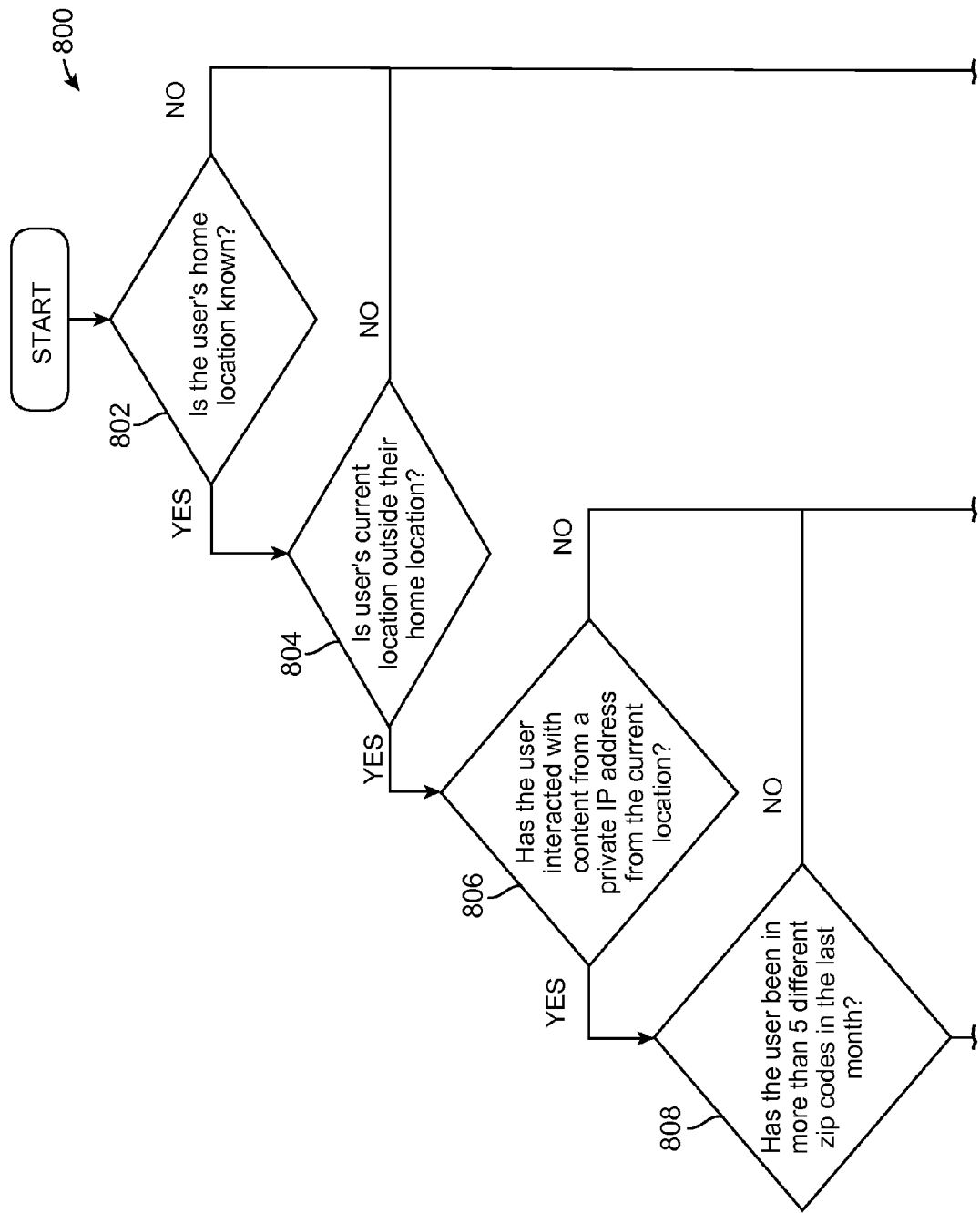
FIG. 8 illustrates an exemplary method of assigning a user to a spatial-temporal segment based on whether the user is traveling.
Figure 8:
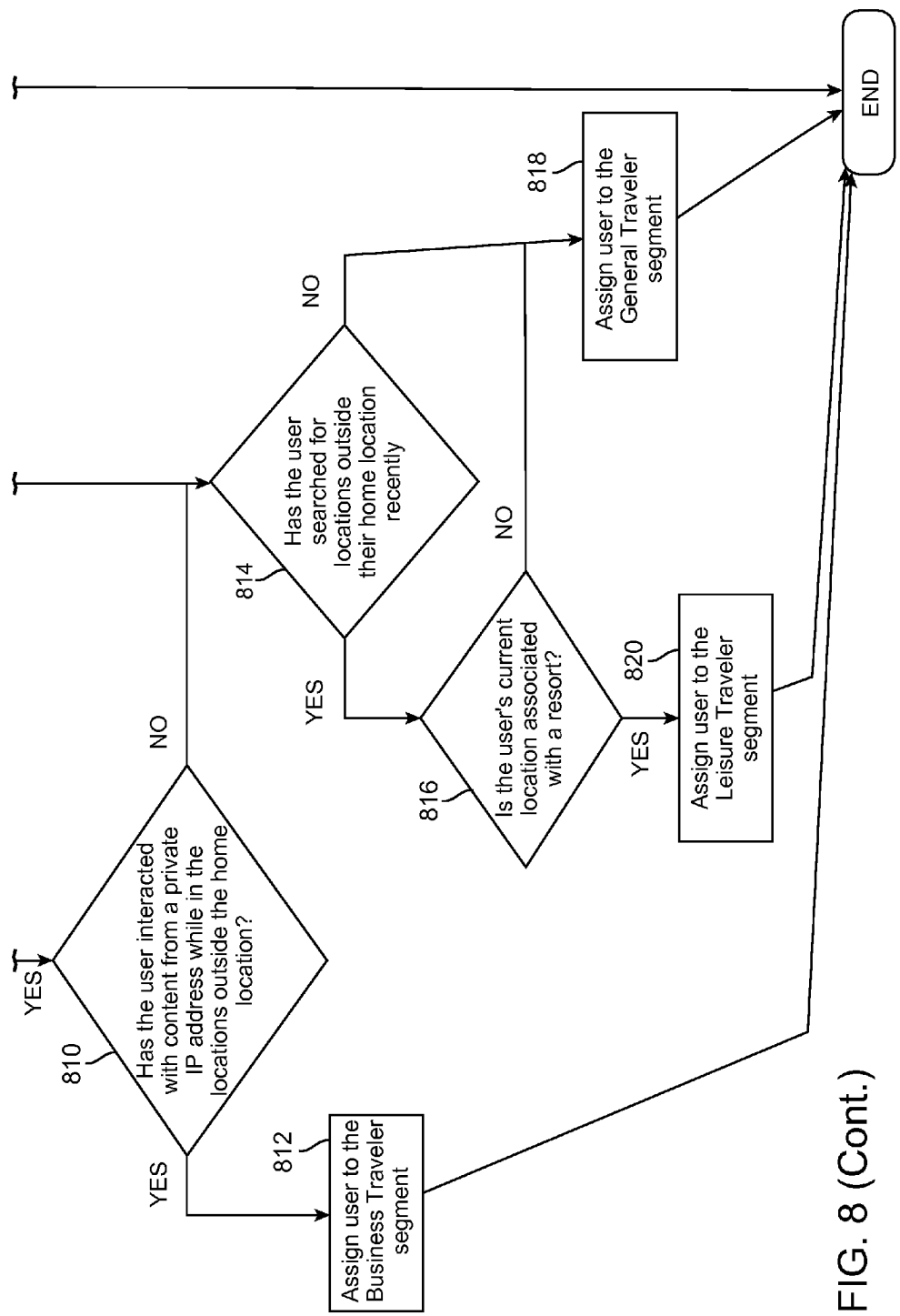

FIG. 8 illustrates another example of assigning a user to a spatial segment. The method 800 in FIG. 8 can be used to assign a user to a segment based on whether the user is traveling and the type of traveling the user is doing. The method 800 begins at 802, where the delivery system 106 checks if the user's home location is known. In some cases, the user's home location might be stored in the user's profile in the user profile database 120. For example, the delivery system 106 may be able to access an account database, such as the ITUNES database (Apple Inc. of Cupertino, Calif.) to obtain the user's billing information. Alternatively, the delivery system 106 may be able to derive the user's home location from other user characteristics. For example, through an analysis of the user characteristic data, the delivery system 106 may be able to detect that the user is in the same area every day from 7 p.m. to 7 a.m. and infer that the area is the user's home location. The delivery system 106 can be configured to express the home location in a number of different ways. For example, in some configurations the home location may be expressed as a latitude and longitude value. Alternatively, the home location may be expressed as a zip code. Other expressions are also possible. Further, when determining if a user is traveling, a precise expression of home location may not be needed; the user's home city may be sufficient for such a categorization.

If the delivery system 106 is unable to obtain the user's home location, the delivery system 106 will be unable to determine whether the user is traveling, and the method 800 is then complete. However, if the home location is known, then the delivery system 106 checks if the resolved location is outside their home location (804). If the user is not outside the user's home location, then the user is not traveling, and the method 800 is complete. In some configurations, depending on how the user's home location is expressed and outside home location is defined, the delivery system can assign a user who is not outside their home location to the Comfort Zone segment.

If the user is outside the user's home location, the delivery system 106 infers that the user is traveling, and then tries to determine what type of travel the user is doing. To characterize the type of travel, the delivery system 106 checks if the user has interacted with content from a private IP address from the resolved location (806). If so, the delivery system 106 checks if the user has been in more than 5 different zip codes outside of the user's home zip code in the last month (808). In some configurations, the number of different zip codes can be more or fewer. Additionally, the delivery system 106 could check for a change in city or some other geographic boundary instead of zip code. If the user's travel has exceed the specified number of zip codes, the delivery system checks if the user has interacted with content from a private IP address while in those different locations outside of the home location (810). If so, the user is assigned to the Business Traveler segment (812).

If the answer to the query at steps 806, 808, or 810 is "no," then the delivery system 106 does not have enough information to categorize the user as Business Traveler. As a result, the delivery system 106 checks if the user has searched for locations outside the user's home location recently (814). If not, the delivery system 106 assigns the user to the General Traveler segment (818). Otherwise, the delivery system 106 checks if the resolved location is associated with a resort (816). If the location is a resort, then the user is assigned to the Leisure Traveler segment (820). Otherwise, the user is assigned to the General Traveler segment (818).

In some configurations, the delivery system 106 may also be able to assign the user to the Out of Comfort Zone segment in steps 812, 818, and 820. Other methods can also be used to categorize a user into the Business, Leisure, or General Traveler segments.

Figure 9:
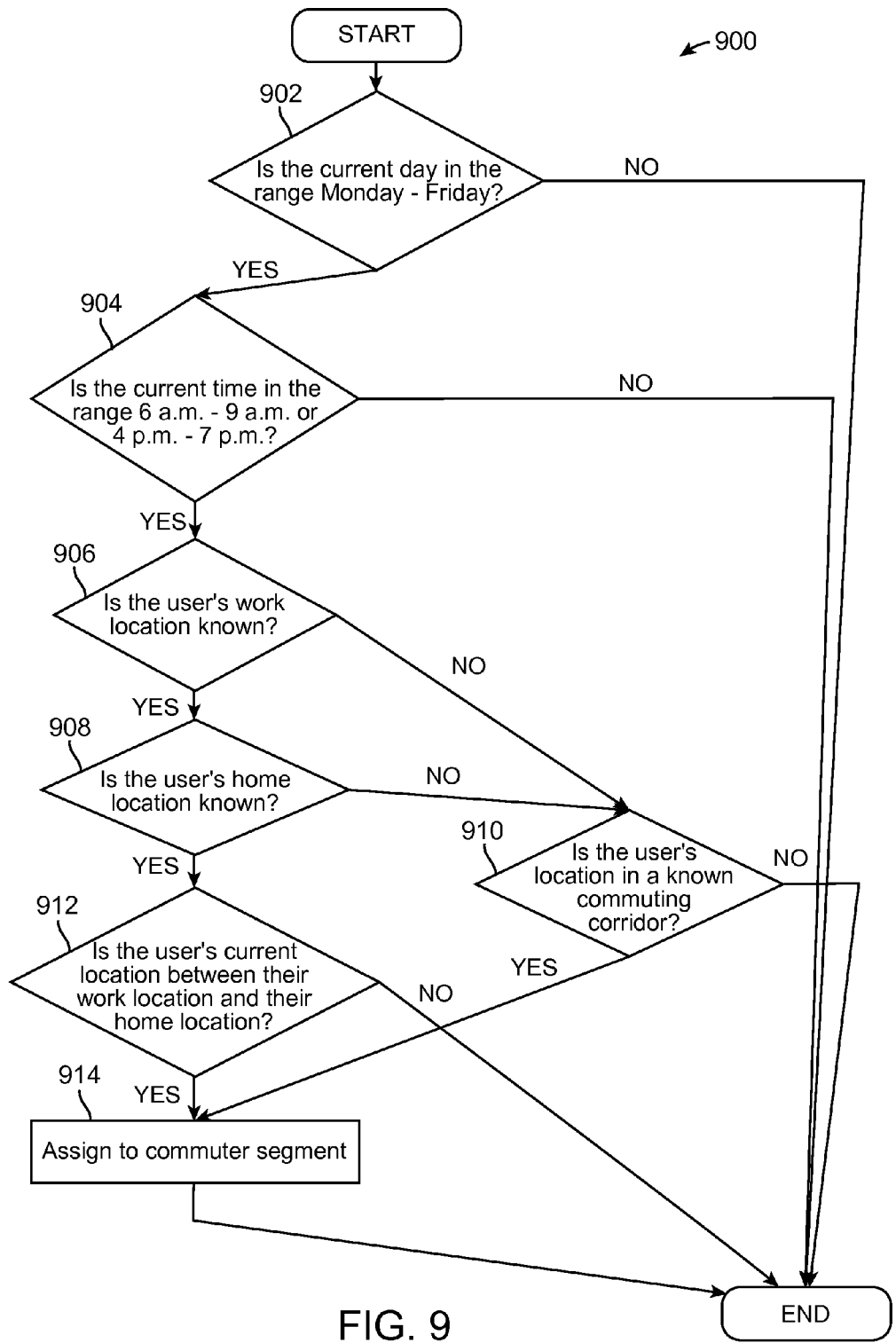
FIG. 9 illustrates an exemplary method of assigning a user to a spatial-temporal segment based on whether the user is commuting.

FIG. 9 illustrates an example of assigning a user to a spatial-temporal segment. The method 900 in FIG. 9 can be used to assign a user to a segment based on whether the user is currently commuting between work and home. The method 900 begins at step 902 where the delivery system 106 checks if the current day falls in the traditional work week of Monday through Friday. If not, the delivery system assumes the user is not commuting, and the method 900 is complete. Next, the delivery system 106 checks if the current time is during the traditional commuting hours, for example, 6 a.m. through 9 a.m. or 4 p.m. through 7 p.m. If not, the delivery system 106 assumes the user is not commuting, and the method 900 is complete.

If the current day and time satisfy the commuting day and time requirements, the delivery system checks if the user's work location is known (906). In some cases, the user's work location might be stored in the user's profile in the user profile database 120. Alternatively, the delivery system 106 may be able to derive the user's work location from other user characteristics. For example, through an analysis of the user characteristic data, the delivery system 106 may be able to detect that the user is in the same area Monday through Friday, 8 a.m. to 5 p.m., and infer that the area is the user's work location.

If the user's work location is known, the delivery system checks if the user's home location is known (908). In some cases, the user's home location might be stored in the user's profile in the user profile database 120. For example, the delivery system 106 may be able to access an account database, such as the ITUNES database (Apple Inc. of Cupertino, Calif.), to obtain the user's billing information. Alternatively, the delivery system 106 may be able to derive the user's home location from other user characteristics. For example, through an analysis of the user characteristic data, the delivery system 106 may be able to detect that the user is in the same area every day from 7 p.m. to 7 a.m., and infer that the area is the user's home location.

If both the work and home locations are known, the delivery system 106 checks if the resolved location is between the work and home locations (912). If so, the delivery system 106 assigns the user to the Commuter segment (914). If not, no segment assignment is performed, and the method 900 is complete.

If the location in either step 906 or 908 is unknown, the delivery system 106 can try to determine if the resolved location is in a known commuting corridor (910). To answer this query, the delivery system 106 can map the resolved location to a zone within a map containing commuting corridors. If the location falls within a commuting corridor zone, the delivery system 106 can assign the user to the Commuter segment (914).

The delivery system 106 can be configured to express the work and home locations in a number of different ways. For example, in some configurations the work and home location may be expressed as a latitude and longitude value. Alternatively, the locations may be expressed as a zip code. Other expressions are also possible. However, the level of granularity may impact the ability to determine if the user is commuting or not. For example, if the work and home locations are expressed as zip codes and the user works and lives in the same zip code, the delivery system 106 may not be able to determine that the user is commuting. Alternatively, if the granularity is not fine enough, the delivery system may not be able to map the location to determine if it falls in a commuting corridor.

Other methods of determining whether the user is commuting between work and home do not rely on the user working during the traditional Monday through Friday work week. In this case, the delivery system 106 may be able to analyze the user characteristic data to determine the user's work schedule, and use that information for assigning the user to the Commuting segment.

Figure 10:
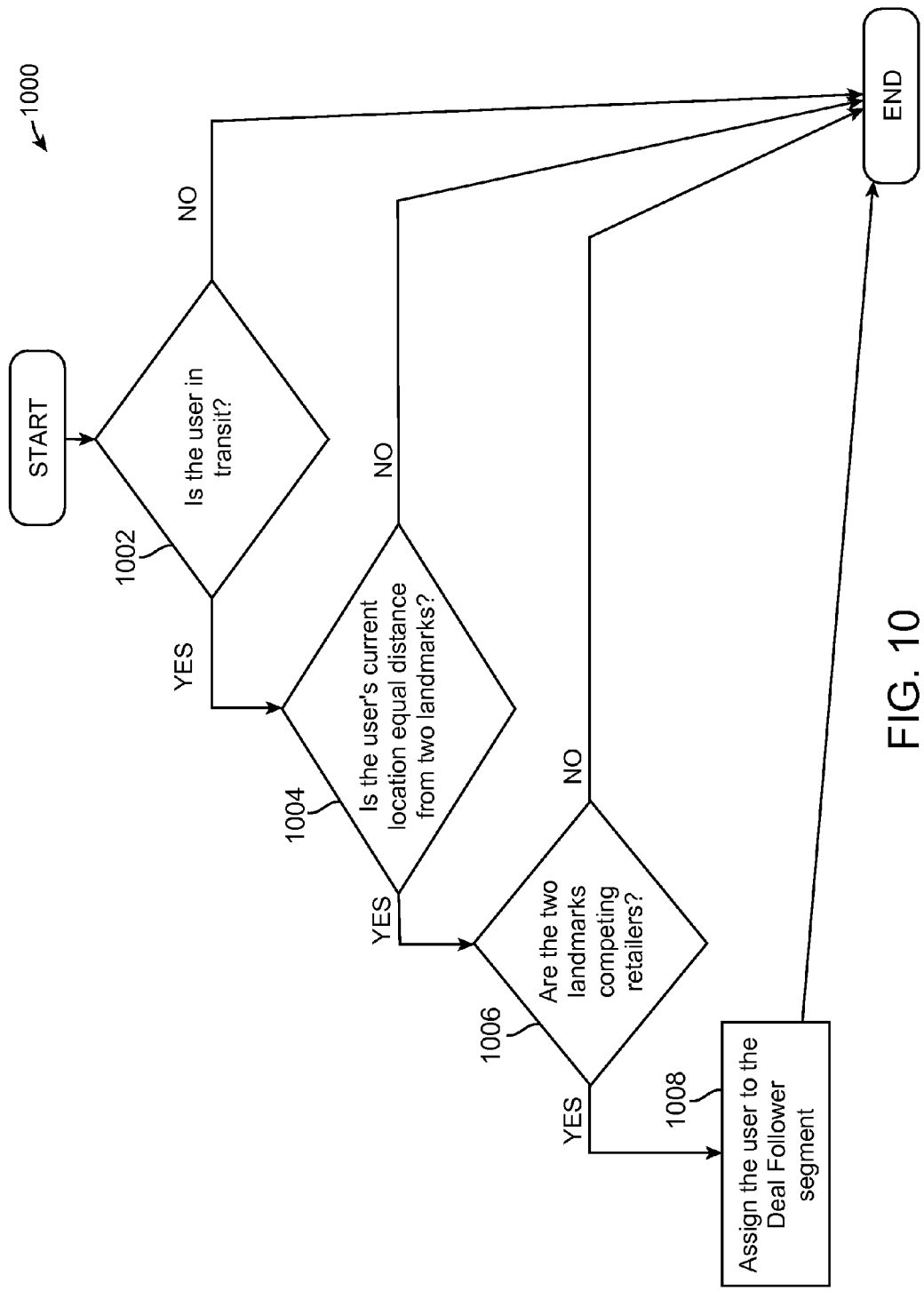
FIG. 10 illustrates an exemplary method of assigning a user to a spatial-temporal segment based on proximity to competing retail locations.

FIG. 10 illustrates another example of assigning a user to a spatial segment. The method 1000 in FIG. 10 can be used to assign a user to a segment based on the user's proximity to competing retail locations. The method 1000 starts at step 1002, where the delivery system 106 determines if the user is in transit. This determination can be made in a number of different ways, such as by using method 700 in FIG. 7. If the user is not in transit, the method 1000 is completed without performing a segment assignment.

If the user is found to be in transit, the delivery system 106 checks if the resolved location is equal distance from two different landmarks (1004). The proximity location can be performed using the landmark database 111 as described above. If the user is equal distance, then the delivery system 106 checks if the two landmarks are competing retailers (1006). If so, the delivery system 106 assigns the user to the Deal Follower segment (1008).

If the answer to the query at either step 1004 or 1006 is "no," then the method 1000 can be completed without performing a segment assignment. Alternatively, the delivery system 106 can be configured to assign the user to the InTransit segment.

Figure 11:
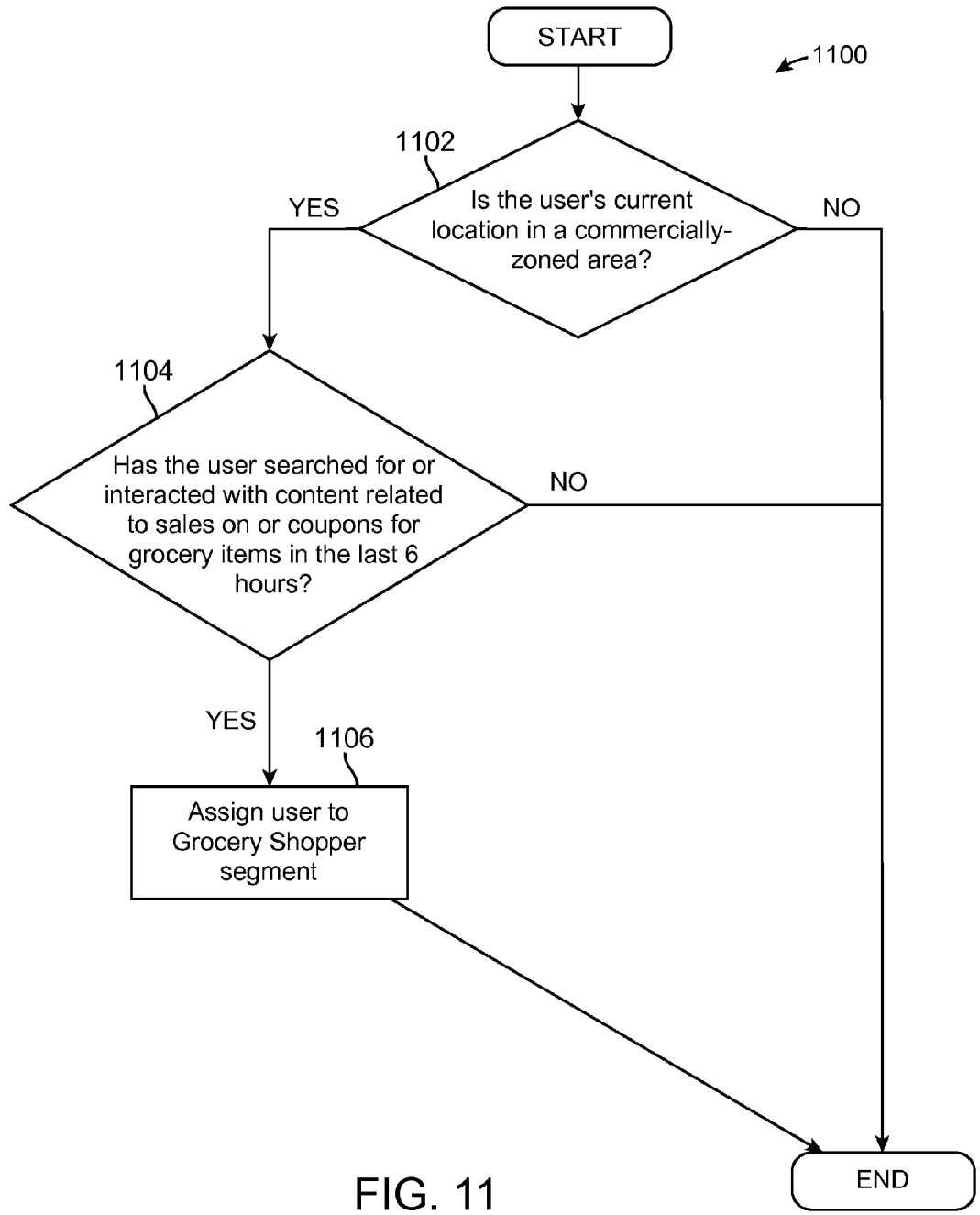
FIG. 11 illustrates an exemplary method of assigning a user to a spatial-temporal segment based on whether the user is grocery shopping.

FIG. 11 illustrates another example of assigning a user to a spatial-temporal segment. The method 1100 in FIG. 11 can be used to assign a user to a segment of grocery shoppers. The method 1100 starts at step 1102, where the delivery system 106 checks if the resolved location is in a commercially-zoned area. To answer this query, the delivery system 106 can map the resolved location to a zone within a map containing commercially-zoned areas. The delivery system 106 can be configured to express the resolved location in a number of different ways. However, the level of granularity may impact the ability to determine if the user is a commercially-zoned area. For example, if the resolved location is expressed as zip codes, this may not be fine-grained enough to determine if the user is in a commercially-zoned area.

If the resolved location is a commercially-zoned area, then the delivery system 106 checks if the user has searched for, or interacted with, content related to sales on, or coupons for, grocery items in the last 6 hours (1104). In some configurations, the period of interest can be more or less than 6 hours. If so, the delivery system 106 assigns the user to the Grocery Shopper segment (1106).

Returning to FIG. 5, as in step 508, a characteristic value can have an associated confidence score, and the delivery system 106 can be configured to only use characteristic values in which the associated confidence score exceeds a specified threshold when assigning a user to a targeted segment. Further, the delivery system 106 can assign a confidence score to any segment assignments. The delivery system 106 can use the segment assignment confidence score in determining whether the segment should be used in selecting invitational content to the user. The confidence score can be based on whether the delivery system 106 believes the resolved location, the proximity calculation, and/or any other factors such as those mentioned above are valid and/or correct. After assigning the user to one or more spatial-temporal segments, the delivery system 106 can store the segment assignments to the user profile database 120.

After resolving a location, which can include proximity calculations and/or segmentation, the delivery system 106 can re-prioritize the segments assigned to the user (514). The segment prioritizing module 128 can be configured to re-order the segments assigned to the user based on the new segment assignments and/or current location. As in step 510, the re-prioritization can consider specified goals, such as performance metrics. In some embodiments, the re-prioritization can occur when the delivery system 106 receives a request for invitational content. The re-prioritized segment order can be a temporary re-ordering that is only used to select invitational content for the request that triggered the re-prioritization. In this case, after the request, the segment order can revert to the ordering determined in step 510. However, the re-ordering can be maintained for a specified period of time, for the current session, until the user characteristic data changes, until steps 510 or 514 are triggered again, etc. In some embodiments, the re-prioritized segment list can be saved to the user profile database 120.

As is evident from the above discussion, real-time, or at least frequently refreshed, user characteristic data can be used to calculate the user's proximity to predefined landmarks and/or assign the user to spatial segments. In such instances, the data can be discarded after calculating the proximities and/or classifying the user into targeted segments. Thus, after the delivery system 106 resolves the location associated with the user's device in step (512), the delivery system 106 can purge some user characteristic data, such as the user's location (516). This data that can be purged, can also be called temporary user characteristic data. In some embodiments, purging some data also serves the benefit of needing to store less sensitive information about a user. Such purging is not only useful with respect to spatial-temporal data, but can also be used with respect to recording user characteristics (which can themselves be derived from some real-time data) or any other segmentation information. Once the data is used to identify the sought-after characteristics, it can be discarded, because it is no longer needed.

Finally, the delivery system 106 delivers invitational content to the user based on the re-prioritized segments (518). The ordered segments can aid in selecting the invitational content. For example, the delivery system 106 can first attempt to deliver invitational content associated with the highest-ranked segment. If no content exists for that segment, the delivery system 106 can go down the prioritized list and pick content associated with the next best segment.

In some embodiments, steps 502-510 in method 500 are performed only when the delivery system 106 receives a request for invitational content. In other configurations, the delivery system 106 can monitor the user characteristics associated with one or more users. When one or more values change, the system can re-assign the one or more users to targeted segments. In some configurations, the delivery system 106 can periodically re-assign the users to targeted segments.

Figure 12:
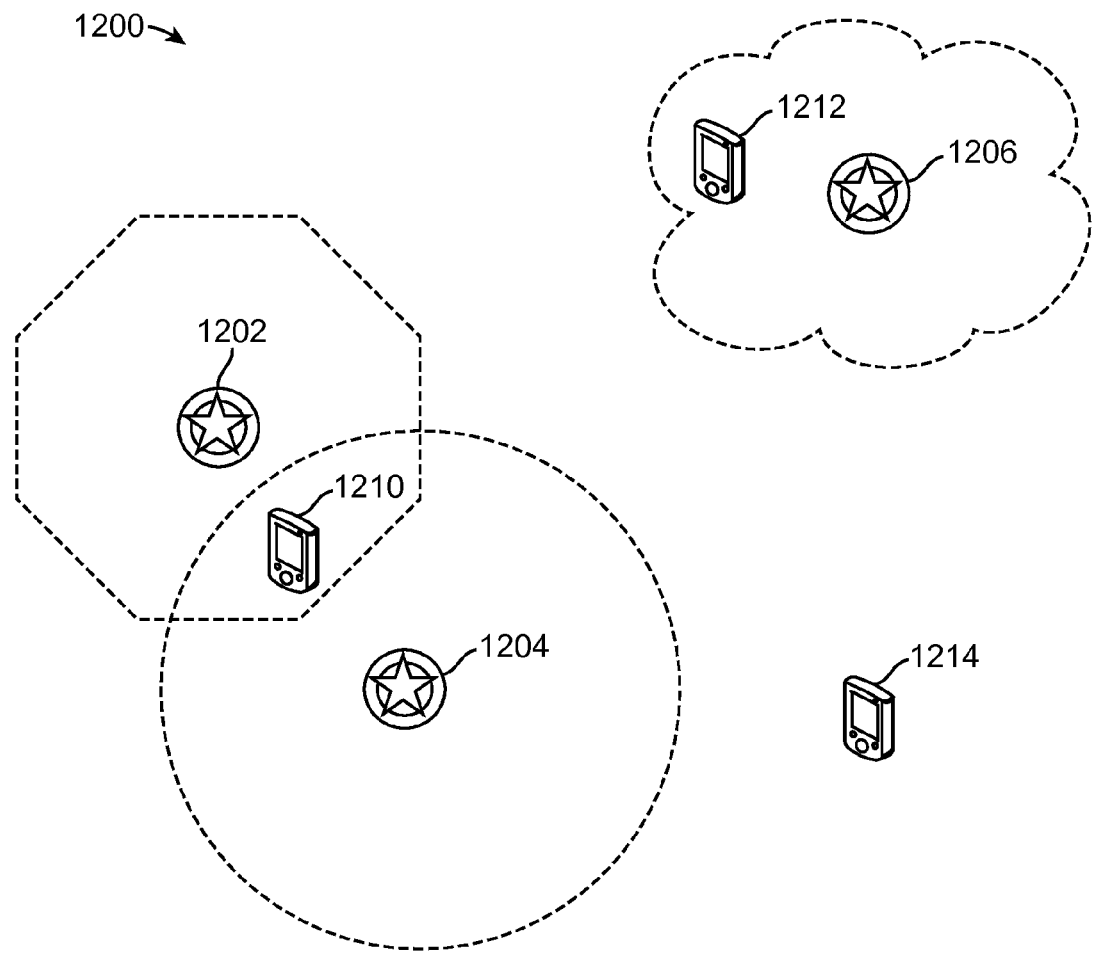
FIG. 12 illustrates delivering invitational content to user based on the user's proximity to a predefined landmark.

FIG. 12 provides an example method 1200 of delivering invitational content to a user based on proximity to a pre-defined landmark. In this example, the delivery system 106 is aware of three landmarks (1202, 1204, 1206). Each landmark has an associated campaign goal that specifies a bounded region for the purpose of targeting users whose device location is within the specified bounded region. When user 1210 makes a request for targeted content, the delivery system calculates the proximity for user 1210 with respect to each of the known landmarks 1202, 1204, 1206. The delivery system 106 determines that the user 1210 is within the specified region of both landmark 1202 and landmark 1204. In some configurations, the delivery system 106 can deliver two items of invitational content: one associated with landmark 1202 and one associated with landmark 1204. However, in some configurations, the delivery system 106 can use the prioritizing modules 128 and/or 130 to determine that the content associated with one landmark should be ranked higher than the other. Another scenario in which prioritization can be beneficial is if the two landmarks are competing retailers. Through other user characteristics, the delivery system may be able to determine that the user is more likely to be interested in one retailer over the other, and thus select the content associated with the favored retailer. As described above, it is possible that even though user 1210 is within the specified bounded region of two landmarks, the delivery system 106 may not select content using method 500. Due to a lack of suitable content, e.g. lack of user interest, selection would not satisfy a campaign goal, etc.

When user 1212 makes a request for targeted content, the delivery system calculates the proximity for user 1212 with respect to each of the known landmarks 1202, 1204, 1206. The delivery system 106 determines that the user 1212 is within the specified bounded region of landmark 1206. If suitable content is associated with landmark 1206, then the delivery system 106 can select it for targeting the user 1212.

When user 1214 makes a request for targeted content, the delivery system 106 calculates the proximity for user 1214 with respect to each of the known landmarks 1202, 1204, 1206. The delivery system 106 determines that the user 1214 is not within the specified bounded region for any of the known landmarks. In this case, the user 1214 is not eligible for targeting based on location proximity. However, it may be possible to target the user using some other targeting technique, such as the spatial-temporal segmentation described above.

In some embodiments, the delivery system 106 is configured to deliver invitational content to a user based on predicted future behavior. In this case, targeted content delivery can be influenced by the user's past behavior, past locations, current behavior, current location, and/or current context. Accordingly, a segment assigner module 124 can be provided for performing segment assignments that represent the user's past behavior. The delivery system 106 can also include a segment database 114 that stores previously defined targeted segments. Having defined segments to work with, the assigner module 124 can analyze one or more user characteristic values and one or more targeted segment definitions to determine if the user fits within a population segment defined by a targeted segment. The delivery system 106 can then use the user's current context and/or the segment assignments to select invitational content to send to the user.

Figure 13:
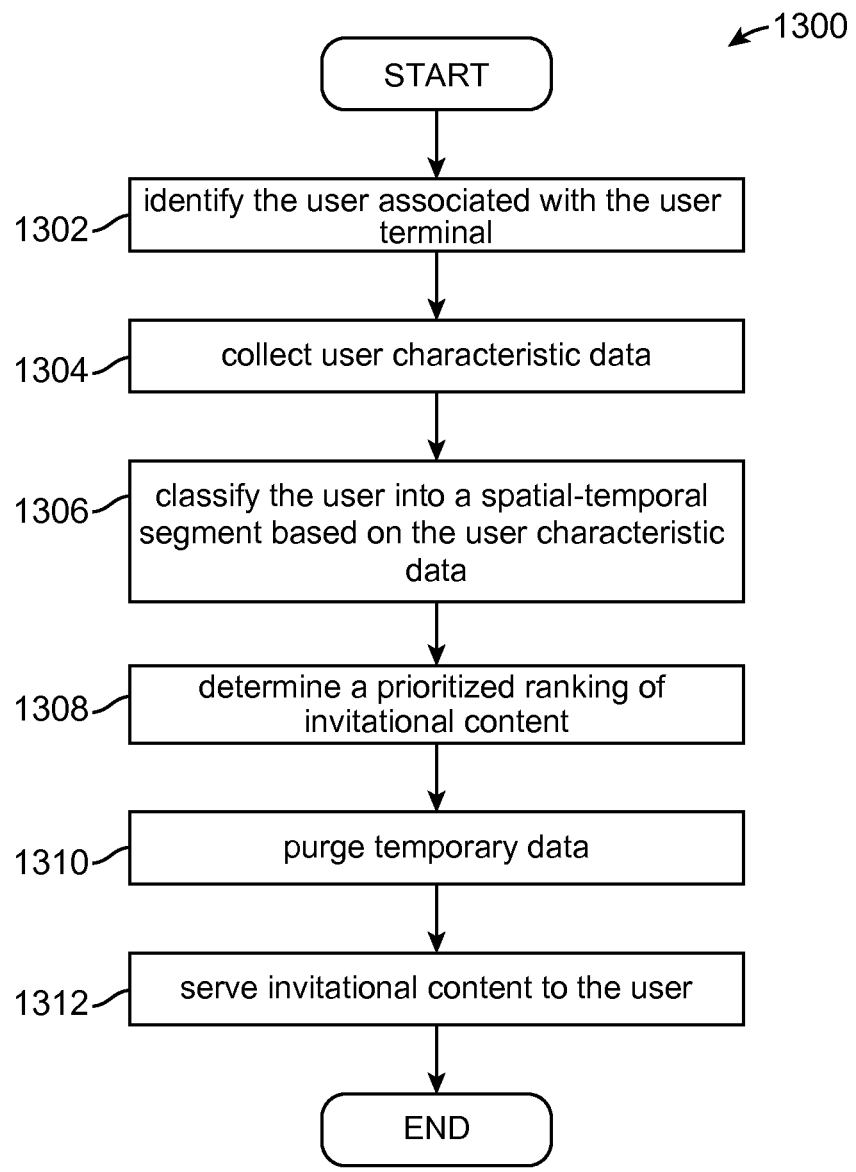
FIG. 13 illustrates an exemplary method embodiment for delivering targeted invitational content based on predicted future behavior.

FIG. 13 is a flowchart illustrating steps in an exemplary method 1300 for delivering invitational content based on predicted future behavior. For the sake of clarity, this method is discussed in terms of an exemplary system such as is shown in FIG. 1. Although specific steps are shown in FIG. 13, in other embodiments, a method can have more or fewer steps than shown.

First, the delivery system 106 identifies the user associated with the user terminal (1302). This identification can be performed in many ways. For example, as described above, when the delivery system 106 receives a request for a content package, the request can include some identifying information associated with the requesting user terminal or the associated user. This information can then be correlated to an entry in the UUID database 116 to retrieve an identity of the user. In other configurations, the user can be identified by analyzing the requesting device's attributes in order to determine whether such requests can be attributed to a same device, also as described above. Other methods can also be used.

Meanwhile, the delivery system 106 can collect user characteristic data descriptive of the user and/or the user's interaction with one or more items of content within a network of targeted content delivery channels (1304). The data can include any number of characteristics associated with a user's interaction with invitational content or any contextual characteristics, such as channel, demographic, behavioral, and/or spatial-temporal characteristics. As described above, the delivery system 106 can include a user profile database 120. A user profile can include information descriptive of the user and/or the user's interaction with various items of content. In this case, the delivery system 106 can obtain user characteristics from the user's profile in the user profile database 120. The delivery system 106 can also use real-time user characteristic values based on the identified user's activities during the current session and/or data provided as part of a request for invitational content.

In some cases, the user characteristic data can include the location of the user's device. The location associated with the user's device can be provided as a latitude and/or longitude value. However, other methods of expressing location are also possible, such as zip code, city, state, etc. The location value can be provided as part of the request for a content package, or can be obtained through other interaction with the user.

Periodically, the delivery system 106 classifies the user into a spatial-temporal segment based on the user characteristic data (1306). In some embodiments, the classification step can require that the delivery system 106 analyze the user characteristic data. In some cases, during the analysis, the delivery system 106 can discover that one or more user characteristic values used to assign a user to a targeted segment of the population is/are missing or uncertain. To address this issue, the delivery system 106 can infer/derive a user characteristic value from trusted values. As described in method 500, the delivery system 106 can use a variety of sources to infer/derive a user characteristic value, such as another database of data, user characteristics from a population of users, and/or other user characteristics for the user. In some situations, the user characteristic data may not include the location of the user's device. However, demographic characteristics about the user may be known that the delivery system 106 can use to derive uncertain spatial-temporal characteristics. For example, the user may exhibit a sufficient similarity to other users that are known to grocery shop on Saturdays between 6 and 7 p.m. As a result, the delivery system 106 can infer that the user is likely to have the same grocery shopping habits as those of the other users. The delivery system 106 can store any newly obtained, inferred, and/or derived user characteristic values to the user profile database 120.

As part of inferring/deriving a user characteristic value, the delivery system 106 can assign a confidence score to the inferred/derived value, where the confidence score represents the likelihood that the particular characteristic is valid and/or correct. The confidence score can be calculated in a number of different ways, and can depend on a variety of factors such as the particular user characteristic, how the characteristic is obtained, the number of characteristics considered, the number of users considered, etc. The delivery system 106 can then use the confidence score when deciding whether to use the value in assigning a user to a targeted segment.

In some cases, the delivery system 106 can analyze the user characteristic data related to the identified user for demographic, behavioral, and/or spatial-temporal patterns. These patterns can indicate a user's present or long-term intent and/or interests. Some examples include identifying when a user is about to travel or is traveling; when a user is in transit; when a user is commuting; when a user is about to grocery shop or is grocery shopping; etc. In some embodiments, machine learning algorithms and predictive algorithms can be used to predict user intent and interest. Additionally, the analysis step can be performed using one or more rules.

From the analysis of the user characteristic data, the system can identify behavior that is likely to be repeated in the future, and assign the user into one or more spatial-temporal segments representative of that past behavior. In some embodiments, classifying algorithms can be used for the spatial-temporal segmentation. FIGS. 14-18 provide illustrative examples of spatial-temporal segmentation based on past behavior.

Figure 14:
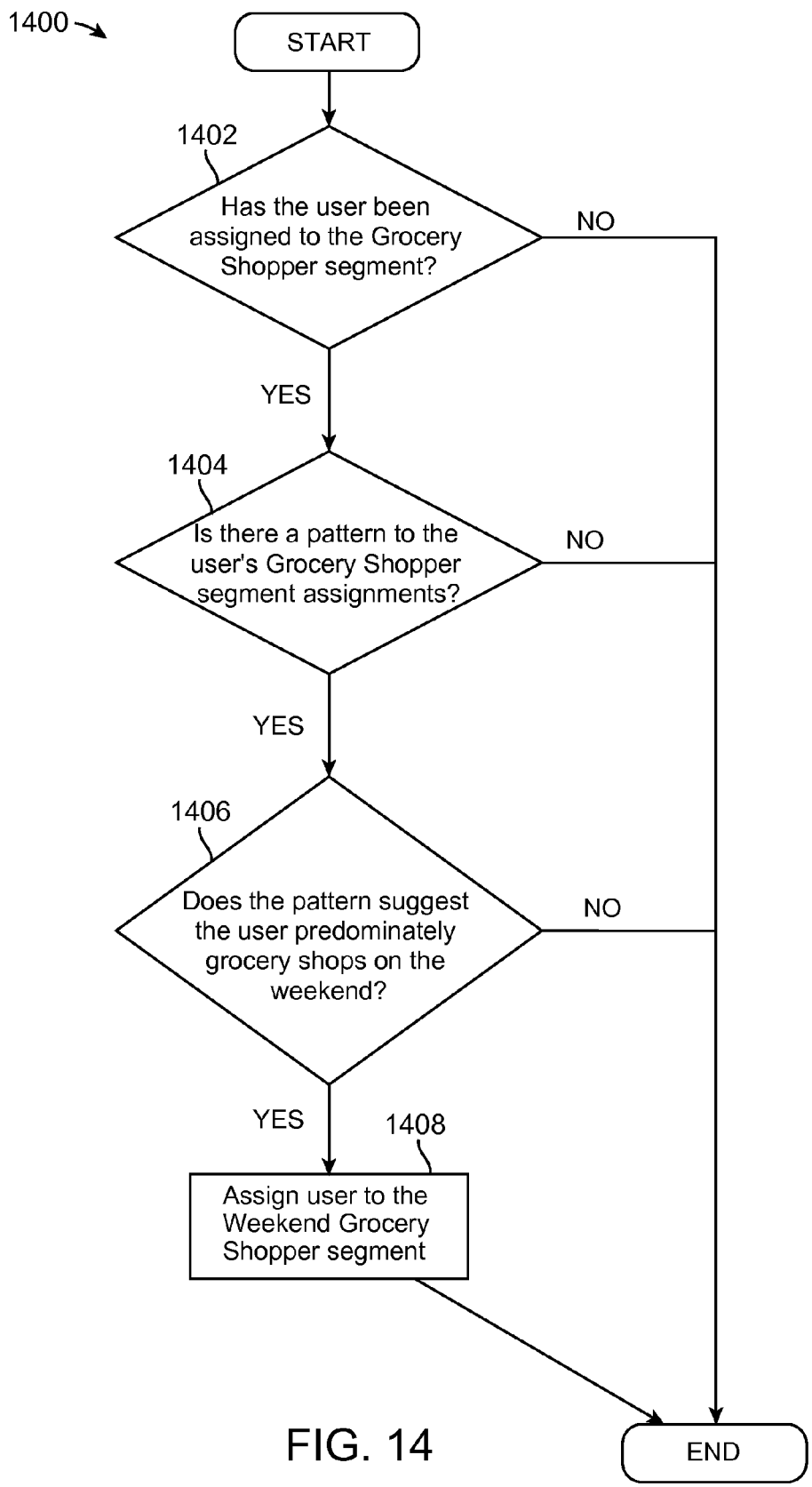
FIG. 14 illustrates an exemplary method of assigning a user to a spatial-temporal segment based on the user's grocery shopping habits.

FIG. 14 illustrates an example method of assigning a user to a spatial-temporal segment. The method 1400 can be used to assign a user to a segment based on the user's past grocery shopping habits. The method begins at 1402, where the delivery system 106 checks if the user has been assigned to the Grocery Shopper segment in the past. The Grocery Shopper segment assignment can be performed using the method 1100 or any other segmentation based on the observation that the user is likely to be grocery shopping at a particular time.

If the user has previously been assigned to the Grocery Shopper segment, the delivery system checks to see if there is a pattern to the user's shopping habits (1404). If there is a pattern, the delivery system 106 checks if the pattern suggests the user predominately grocery shops on the weekend (1406). If so, the delivery system 106 assigns the user to the Weekend Grocery Shopper segment (1408).

Figure 15:
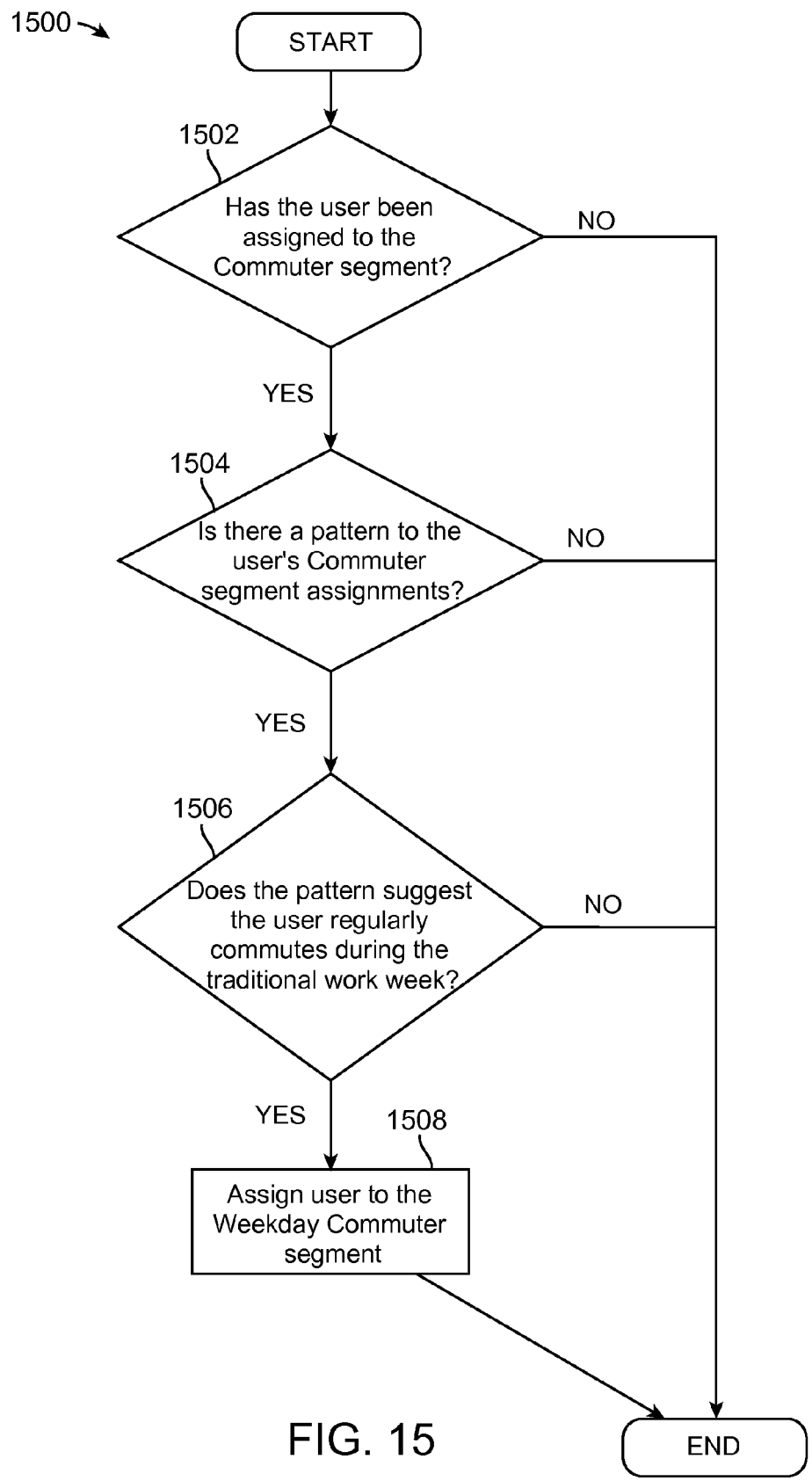
FIG. 15 illustrates an exemplary method of assigning a user to a spatial-temporal segment based on the user's commuting habits.

FIG. 15 illustrates another example method of assigning a user to a spatial-temporal segment. The method 1500 can be used to assign a user to a segment based on the user's past commuting habits. The method begins at 1502, where the delivery system 106 checks if the user has been assigned to the Commuter segment in the past. The Commuter segment assignment can be performed using the method 900 or any other segmentation, based on the observation that the user is likely to be commuting on a particular day and at a particular time.

If the user has previously been assigned to the Commuter segment, the delivery system checks to see if there is a pattern to the user's commuting habits (1504). If there is a pattern, the delivery system 106 checks if the pattern suggests the user regularly commutes during the traditional work week of Monday through Friday (1506). If so, the delivery system 106 assigns the user to the Weekday Commuter segment (1508).

Figure 16:
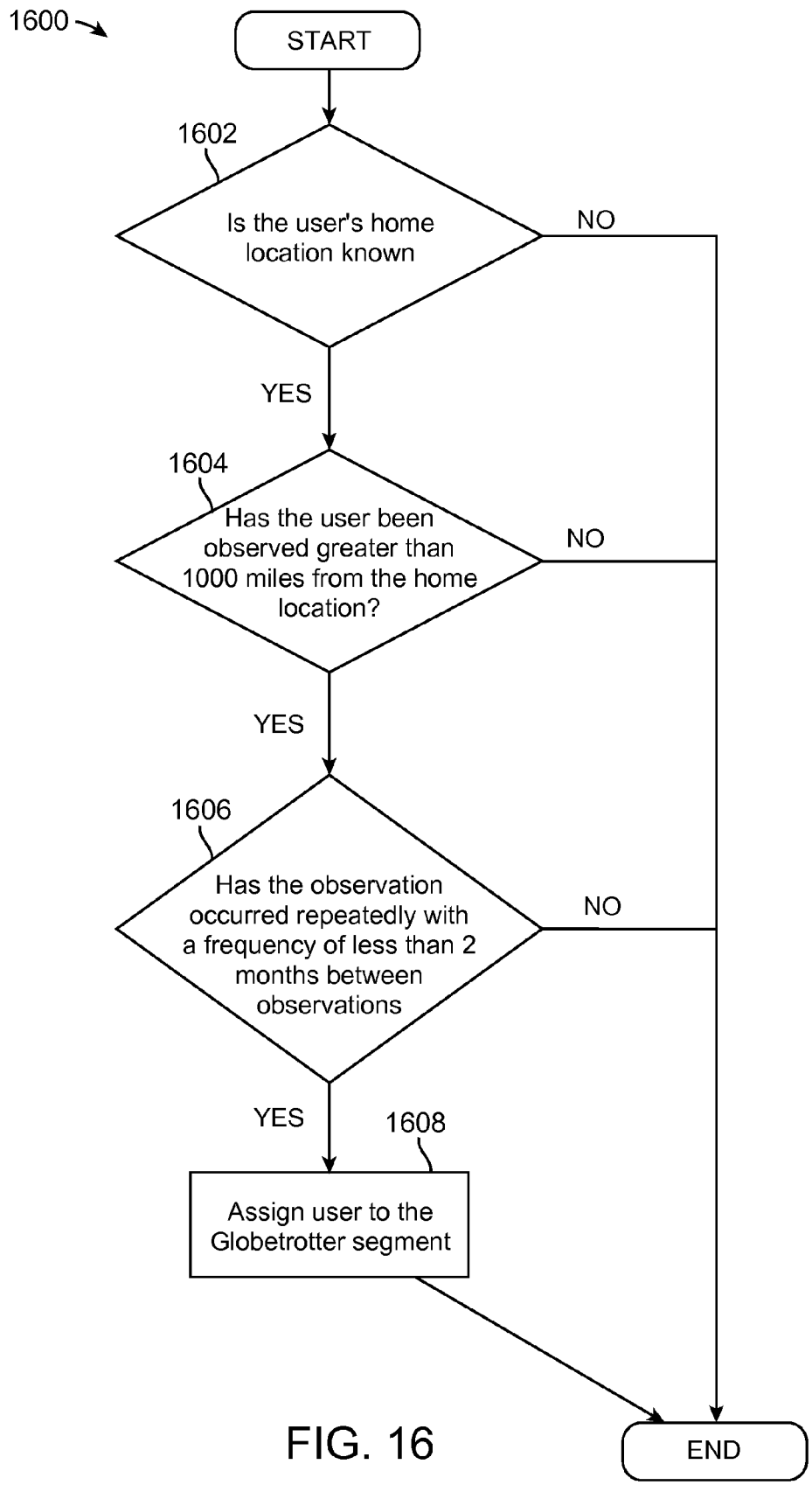
FIG. 16 illustrates an exemplary method of assigning a user to a spatial-temporal segment based on the user's traveling habits.

FIG. 16 illustrates another example method of assigning a user to a spatial-temporal segment. The method 1600 can be used to assign a user to a segment based on the user's past traveling habits. The method begins at 1602, where the delivery system 106 checks if the user's home location is known. In some cases, the user's home location might be stored in the user's profile in the user profile database 120. For example, the delivery system 106 may be able to access an account database, such as the ITUNES database (Apple Inc. of Cupertino, Calif.), to obtain the user's billing information. Alternatively, the delivery system 106 may be able to derive the user's home location from other user characteristics. For example, through an analysis of the user characteristic data, the delivery system 106 may be able to detect that the user is in the same area every day from 7 p.m. to 7 a.m., and infer that the area is the user's home location. The delivery system 106 can be configured to express the home location in a number of different ways. For example, in some configurations, the home location may be expressed as a latitude and longitude value. Alternatively, the home location may be expressed as a zip code. Other expressions are also possible.

If the user's home location is known, the delivery system 106 checks if the user has been observed greater than 1000 miles from the user's home location (1604). In some configurations, the distance from the home location can be more or less than 1000 miles. If so, the delivery system checks if the observation has occurred repeatedly with a frequency of less than two months between observations (1606). The definition of "repeatedly" can vary with the configuration of the system. In some configurations, it may be sufficient that the observation has occurred consistently over the past 1 year, while other configurations may require more or less time. If the answer to the query in step 1606 is "yes," the delivery system 106 assigns the user to the Globetrotters segment (1608).

Figure 17:
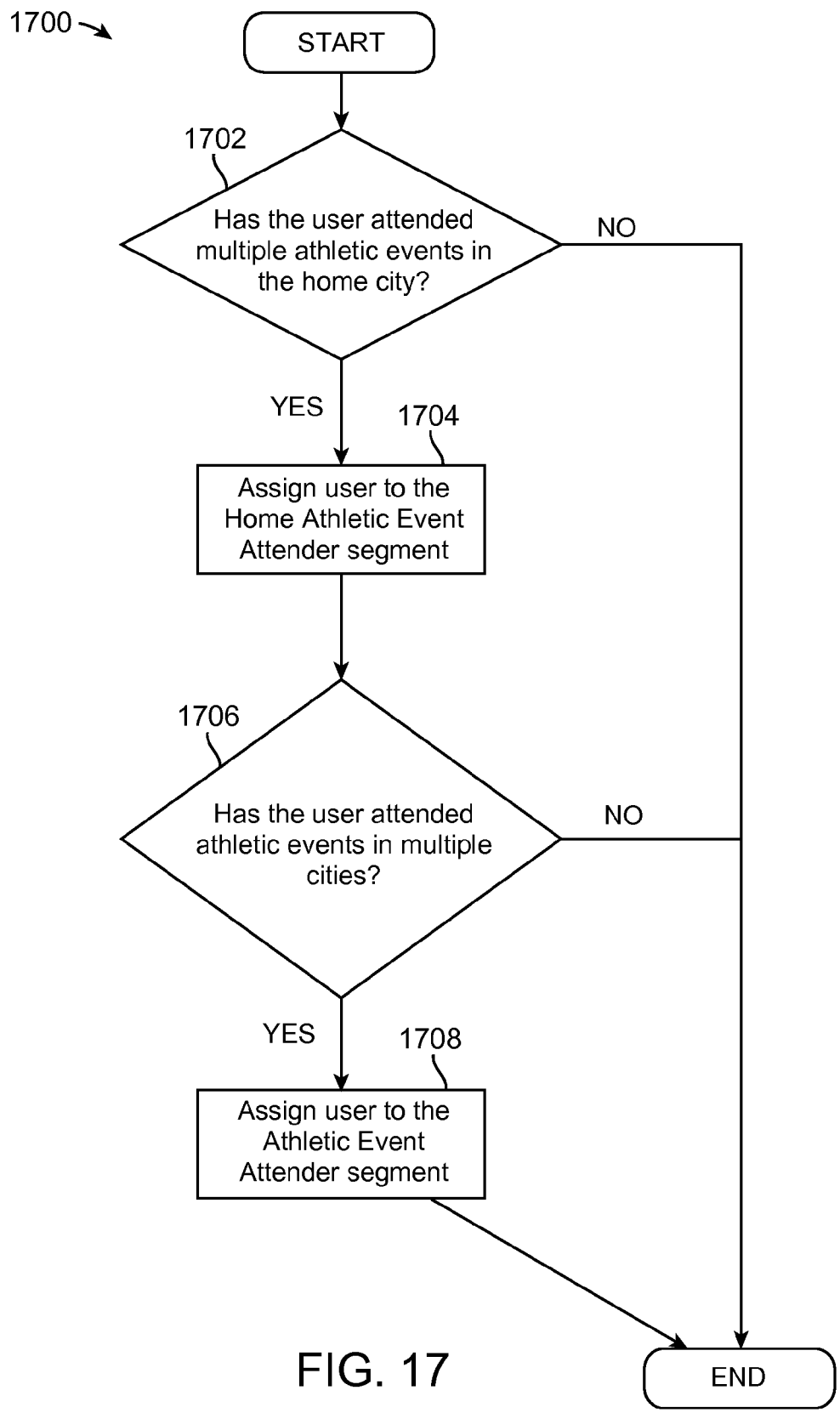
FIG. 17 illustrates an exemplary method of assigning a user to a spatial-temporal segment based on the user's athletic event attending habits.

FIG. 17 illustrates another example method of assigning a user to a spatial-temporal segment. The method 1700 can be used to assign a user to a segment based on the user's habits of attending athletic events for a particular team, e.g. the San Jose Sharks. The method begins at 1702, where the delivery system 106 checks if the user has attended multiple athletic events in the home city of the particular team. The definition of "multiple events" can vary with the configuration of the system. In some configurations, the user may be required to attend a majority of the home events, while in other configurations, the user may only have to attend a quarter. If the user has attended the requisite number of events, the delivery system 106 assigns the user to the Home Athletic Event Attender segment for that particular team (1704).

The delivery system 106 then checks if the user has attended athletic events for the particular team in multiple cities (1706). Similar to the aforementioned definition, the definition of "multiple cities" can vary with the configuration of the system. In some configurations, the user may be required to attend events in a majority of the cities in which such events are held, while in other configurations it may be more or fewer. If the user has attended events in the requisite number of cities, the user is assigned to the Athletic Event Attender segment for that particular team (1708).

As with the user characteristic values, the delivery system 106 can assign a confidence score to the targeted segment assignment. In this case, any confidence scores associated with any user characteristic values can be factored into the confidence score for the segment assignment. The delivery system 106 can use the segment assignment confidence score in determining whether the segment should be used in selecting invitational content for the user. The delivery system 106 can update the user profile database 120 to reflect the segment assignments.

In some embodiments, the classification step 1306 can be performed when the delivery system 106 receives a request for invitational content. In other configurations, the delivery system 106 can monitor the user characteristics associated with one or more users. When one or more values change, the system can re-assign the one or more users to targeted segments. In some configurations, the delivery system 106 can periodically re-assign the users to targeted segments.

In some cases, it may be possible for a user to be grouped into several spatial-temporal segments, and thus be eligible to receive targeted content associated with any of those segments. However, some segments can be deemed more important, more valuable, associated with more content, and/or more applicable given the context. Therefore, in some embodiments, the delivery system 106 can be configured to prioritize the one or more targeted segments associated with the user (1308). To create the prioritized ranking of segments, the segment prioritizing module 128 can be configured to take a list of targeted segments and order the list based on a specified goal. The goal can be specified by a content provider and/or the delivery system 106. The goal can specify an objective, such as a performance metric, an optimization, a context, etc. Further, a goal can specify more than one objective. In the case of multiple objectives, the delivery system 106 can be configured to create a balance between the objectives. Additionally, the prioritized ranking can be influenced by a determination that the user is likely to repeat a past behavior. For example, if the user is classified as one who grocery shops on Saturday between 4 and 6 p.m., and the current context indicates that it is Saturday at 2 p.m., then the delivery system 106 may rank this segment higher than other segments or higher than it would be ranked if it was Monday morning.

The prioritizing module 128 can analyze the list of targeted segments assigned to a user and determine the ideal ordering of those segments with respect to the associated objective. Further, the prioritizing module 128 can consider the segment assignment confidence score when performing the ranking. For example, those segments with a confidence score less than a specified threshold can be ranked lower, or not at all, even if the segment is a better match.

The segment prioritization can occur at various times. For example, the delivery system 106 can be configured to trigger the prioritizing module 128 at specified intervals. Alternatively, the prioritizing module 128 can order the segments when the delivery system 106 receives a request for invitational content. In some configurations, the prioritizing module 128 can monitor the user characteristics and/or objectives and perform the prioritization when a change in the user characteristics and/or objectives is detected. After prioritizing the segments, the delivery system 106 can use the ordered list to aid in selecting invitational content to deliver to the user.

As is evident from the above discussion, real-time, or, at least, frequently refreshed, user characteristic data, can be used to assign the user to spatial-temporal segments and/or prioritize invitational content. In such instances, the data can be discarded once the classification and/or prioritization is/are completed. Thus, after the delivery system 106 completes steps 1306 and/or 1308, the delivery system 106 can purge temporary user characteristic data, such as the user's location (1310). In some embodiments, purging some data also serves the benefit of needing to store less sensitive information about a user. Such purging is not only useful with respect to spatial-temporal data, but can also be used with respect to recording user characteristics (which can themselves be derived from some real-time data) or any other segmentation information. Once the data is used to identify the sought-after characteristics, it can be discarded, because it is no longer needed.

Finally, the delivery system 106 serves invitational content to the user (1312). The ordered segments can aid in selecting the invitational content. For example, the delivery system 106 can first attempt to deliver invitational content associated with the highest-ranked segment. If no content exists for that segment, the delivery system 106 can go down the prioritized list and pick content associated with the next best segment.

To illustrate delivering targeted content based on predicted future movement using method 1300, consider the San Jose Sharks Athletic Event Attender targeted segment. A user can be assigned to this segment if the user's past behavior indicates that he/she is likely to attend San Jose Sharks games. Over the past year, the user has attended a number of Sharks games in San Jose as well as various other cities. Because of this behavior, the delivery system 106 has classified the user into the San Jose Sharks Athletic Event Attender targeted segment.

Suppose the delivery system 106 is configured such that the game schedule is known to the delivery system 106. The San Jose Sharks Athletic Event Attender targeted segment is associated with a campaign goal that indicates a user can be targeted with the invitational content up to 2 hours before a game, if it is likely the user will attend the game. At time A, the delivery system 106 receives a request for content. The current context indicates that the San Jose Sharks are not playing a game, so the delivery system 106 either does not rank the segment, or ranks the segment at the bottom of the list. At time B, the delivery system 106 receives another request for content. The context at time B indicates that the San Jose Sharks are playing a game. However, analysis of the user's characteristics reveals that the user is not likely to attend the game, because the user is not in the same city as the game. As a result, the delivery system 106 again does not rank the segment, or ranks the segment at the bottom of the list. At time C, the delivery system 106 receives yet another request for content. In this case, the context indicates that the San Jose Sharks are playing a game, and that it is an hour before the game. Additionally, an analysis of the user's characteristics reveals that the user is likely to attend the game. Based on this analysis and the context, the delivery system gives the targeted segment a high ranking. If the segment is ranked high enough, the delivery system 106 can deliver the content associated with the segment to the user.

Figure 18:
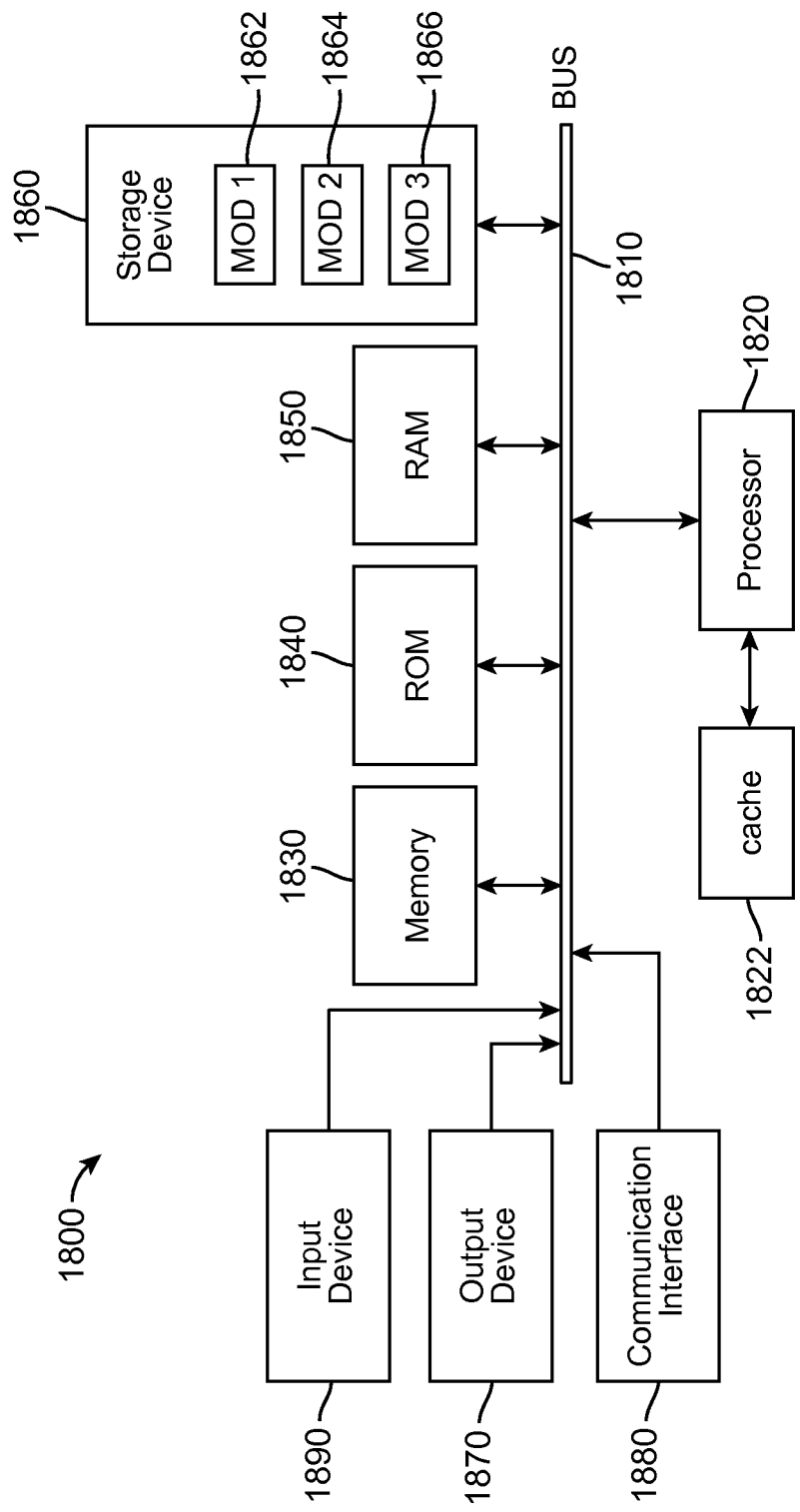
FIG. 18 illustrates an example system embodiment.

With reference to FIG. 18, an exemplary system 1800 includes a general-purpose computing device 1800, including a processing unit (CPU or processor) 1820 and a system bus 1810, that couples various system components, including the system memory 1830, such as read only memory (ROM) 1840 and random access memory (RAM) 1850 to the processor 1820. The system 1800 can include a cache 1822 of high speed memory connected directly with, in close proximity to, or integrated with, as part of the processor 1820. The system 1800 copies data from the memory 1830 and/or the storage device 1860 to the cache 1822 for quick access by the processor 1820. In this way, the cache 1822 provides a performance boost that avoids processor 1820 delays while waiting for data. These and other modules can be configured to control the processor 1820 to perform various actions. Other system memory 1830 may be available for use as well. The memory 1830 can include multiple different types of memory with different performance characteristics. It can be appreciated that the disclosure may operate on a computing device 1800 with more than one processor 1820, or on a group or cluster of computing devices networked together to provide greater processing capability. The processor 1820 can include any general purpose processor and a hardware module or software module, such as module 1 1862, module 2 1864, and module 3 1866, stored in storage device 1860, configured to control the processor 1820, as well as a special-purpose processor, where software instructions are incorporated into the actual processor design. The processor 1820 may essentially be a completely self-contained computing system, containing multiple cores or processors, a bus, memory controller, cache, etc. A multi-core processor may be symmetric or asymmetric.

The system bus 1810 may be any of several types of bus structures, including a memory bus or memory controller, a peripheral bus, and a local bus using any of a variety of bus architectures. A basic input/output (BIOS) stored in ROM 1840, or the like, may provide the basic routine that helps to transfer information between elements within the computing device 1800, such as during start-up. The computing device 1800 further includes storage devices 1860, such as a hard disk drive, a magnetic disk drive, an optical disk drive, tape drive or the like. The storage device 1860 can include software modules 1862, 1864, 1866 for controlling the processor 1820. Other hardware or software modules are contemplated. The storage device 1860 is connected to the system bus 1810 by a drive interface. The drives and the associated computer readable storage media provide nonvolatile storage of computer readable instructions, data structures, program modules and other data for the computing device 1800. In one aspect, a hardware module that performs a particular function includes the software component stored in a non-transitory computer-readable medium in connection with the necessary hardware components, such as the processor 1820, bus 1810, display 1870, and so forth, to carry out the function. The basic components are known to those of skill in the art, and appropriate variations are contemplated, depending on the type of device, such as whether the device 1800 is a small, handheld computing device, a desktop computer, or a computer server.

Although the exemplary embodiment described herein employs the hard disk 1860, it should be appreciated by those skilled in the art that other types of computer readable media, which can store data that are accessible by a computer, such as magnetic cassettes, flash memory cards, digital versatile disks, cartridges, random access memories (RAMs) 1850, read only memory (ROM) 1840, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 1800, an input device 1890 represents any number of input mechanisms, such as a microphone for speech, a touch-sensitive screen for gesture or graphical input, a keyboard, a mouse, a motion input, speech, and so forth. An output device 1870 can also be one or more of a number of output mechanisms known to those of skill in the art. In some instances, multimodal systems enable a user to provide multiple types of input to communicate with the computing device 1800. The communications interface 1880 generally governs and manages the user input and system output. There is no restriction on operating on any particular hardware arrangement, and therefore, the basic features here may easily be substituted for improved hardware or firmware arrangements as they are developed.

For clarity of explanation, the illustrative system embodiment is presented as including individual functional blocks, including functional blocks labeled as a "processor" or processor 1820. The functions these blocks represent may be provided through the use of either shared or dedicated hardware, including, but not limited to, hardware capable of executing software and hardware, such as a processor 1820, that is purpose-built to operate as an equivalent to software executing on a general purpose processor. For example, the functions of one or more processors presented in FIG. 18 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 1840 for storing software performing the operations discussed below, and random access memory (RAM) 1850 for storing results. Very large scale integration (VLSI) hardware embodiments, as well as custom VLSI circuitry, in combination with a general purpose DSP circuit, may also be provided.

The logical operations of the various embodiments are implemented as: (1) a sequence of computer-implemented steps, operations, or procedures running on a programmable circuit within a general-use computer; (2) a sequence of computer-implemented steps, operations, or procedures running on a specific-use programmable circuit; and/or (3) interconnected machine modules or program engines within the programmable circuits. The system 1800 shown in FIG. 18 can practice all or part of the recited methods, can be a part of the recited systems, and/or can operate according to instructions in the recited non-transitory computer-readable storage media. Such logical operations can be implemented as modules configured to control the processor 1820 to perform particular functions according to the programming of the module. For example, FIG. 18 illustrates three modules—Mod1 1862, Mod2 1864 and Mod3 1866—which are modules controlling the processor 1820 to perform particular steps or a series of steps. These modules may be stored on the storage device 1860 and loaded into RAM 1850 or memory 1830 at runtime, or may be stored, as would be known in the art, in other computer-readable memory locations.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general-purpose or special-purpose computer, including the functional design of any special-purpose processor, as discussed above. By way of example, and not limitation, such non-transitory computer-readable media can include RAM, ROM, EEPROM, CD-ROM, or other optical disk storage, magnetic disk storage, or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc., that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based, or programmable consumer electronics, network PCs, minicomputers, mainframe computers, and the like. Embodiments may also be practiced in distributed computing environments, where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only, and should not be construed to limit the scope of the disclosure. Those skilled in the art will readily recognize various modifications and changes that may be made to the principles described herein, without following the example embodiments and applications illustrated and described herein, and without departing from the spirit and scope of the disclosure.

The invention claimed is:

1. A method comprising:
analyzing, by a processor, user characteristic data regarding a first user, the user characteristic data indicating user actions performed by the first user based on time;
assigning, by the processor, the first user to a first spatial-temporal segment when analyzing the user characteristic data indicates that the first user performed a target user action associated with the first spatial-temporal segment during a recurring target time associated with the first spatial-temporal segment; and
while the user is assigned to the first spatial-temporal segment:
determining, by the processor, a current location of the first user during the recurring target time associated with the first spatial-temporal segment;
determining, by the processor, that the first user is going to perform the target user action during the recurring target time when the current location of the first user is within a predetermined distance of a target location associated with the first spatial-temporal segment; and
upon a determination that the user is going to perform the target user action, serving, by the processor, invitational content associated with the first spatial-temporal segment to the first user.

2. The method of claim 1, wherein determining the current location of the first user is based on a location of a mobile device of the first user.

3. The method of claim 1, wherein the recurring time is a fixed time repeating weekly.

4. The method of claim 1, wherein the recurring time is variable based on a schedule associated with the target user action.

5. The method of claim 1, wherein the target location is a location where the target user action can be performed.

6. The method of claim 1, wherein the target location is a home location of the first user.

7. The method of claim 1, wherein serving invitational content associated with the first special-temporal segment is performed in response to receiving a content request from a mobile device of the first user during the recurring time.

8. A content delivery system comprising:
a processor; and
a memory containing instructions that, when executed by the processor, cause the processor to:
analyze user characteristic data regarding a first user, the user characteristic data indicating user actions performed by the first user based on time;
assign the first user to a first spatial-temporal segment when analyzing the user characteristic data indicates that the first user performed a target user action associated with the first spatial-temporal segment during a recurring target time associated with the first spatial-temporal segment; and
while the first user is assigned to the first spatial-temporal segment:
determine a current location of the first user during the recurring target time associated with the first spatial-temporal segment;
determine that the first user is going to perform the target user action during the recurring target time when the current location of the first user is within a predetermined distance of a target location associated with the first spatial-temporal segment; and
upon a determination that the user is going to perform the target user action, serve invitational content associated with the first spatial-temporal segment to the first user.

9. The content delivery system of claim 8, wherein determining the current location of the first user is based on a location of a mobile device of the first user.

10. The content delivery system of claim 8, wherein the recurring time is a fixed time repeating weekly.

11. The content delivery system of claim 8, wherein the recurring time is variable based on a schedule associated with the target user action.

12. The content delivery system of claim 8, wherein the target location is a location where the target user action can be performed.

13. The content delivery system of claim 8, wherein the target location is a home location of the first user.

14. The content delivery system of claim 8, wherein serving invitational content associated with the first special-temporal segment is performed in response to receiving a content request from a mobile device of the first user during the recurring time.

15. A non-transitory computer-readable medium containing instructions that, when executed by a computing device, cause the computing device to:

analyze user characteristic data regarding a first user, the user characteristic data indicating user actions performed by the first user based on time;

assign the first user to a first spatial-temporal segment when analyzing the user characteristic data indicates that the first user performed a target user action associated with the first spatial-temporal segment during a recurring target time associated with the first spatial-temporal segment; and while the first user is assigned to the first spatial-temporal segment:

determine a current location of the first user during the recurring target time associated with the first spatial-temporal segment;

determine that the first user is going to perform the target user action during the recurring target time when the current location of the first user is within a predetermined distance of a target location associated with the first spatial-temporal segment; and upon a determination that the user is going to perform the target user action, serve invitational content associated with the first spatial-temporal segment to the first user.

16. The non-transitory computer-readable medium of claim 15, wherein determining the current location of the first user is based on a location of a mobile device of the first user.

17. The non-transitory computer-readable medium of claim 15, wherein the recurring time is a fixed time repeating weekly.

18. The non-transitory computer-readable medium of claim 15, wherein the recurring time is variable based on a schedule associated with the target user action.

19. The non-transitory computer-readable medium of claim 15, wherein the target location is a location where the target user action can be performed.

20. The non-transitory computer-readable medium of claim 15, wherein the target location is a home location of the first user.

21. The non-transitory computer-readable medium of claim 15, wherein serving invitational content associated with the first special-temporal segment is performed in response to receiving a content request from a mobile device of the first user during the recurring time.

* * * * *